(12) United States Patent
Leverich et al.

(10) Patent No.: US 10,146,609 B1
(45) Date of Patent: Dec. 4, 2018

(54) CONFIGURATION OF CONTINUOUS ANOMALY DETECTION SERVICE

(71) Applicant: Splunk, Inc., San Francisco, CA (US)

(72) Inventors: Jacob Barton Leverich, San Francisco, CA (US); Shang Cai, Burnaby (CA); Hongyang Zhang, Vancouver (CA); Mihai Ganea, Vancouver (CA); Alex Cruise, Vancouver (CA)

(73) Assignee: SPLUNK INC., San Francisco, CA (US)

( * ) Notice: Subject to any disclaimer, the term of this patent is extended or adjusted under 35 U.S.C. 154(b) by 213 days.

(21) Appl. No.: 15/206,126

(22) Filed: Jul. 8, 2016

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01)

(58) Field of Classification Search
CPC ..................... G06F 11/079; G06F 11/0721
See application file for complete search history.

(56) References Cited

U.S. PATENT DOCUMENTS

| | | | | |
|---|---|---|---|---|
| 7,379,846 | B1* | 5/2008 | Williams | G06F 11/079 702/183 |
| 2003/0236766 | A1* | 12/2003 | Fortuna | G06F 11/0721 |
| 2006/0277482 | A1 | 12/2006 | Hoffman | |
| 2011/0047418 | A1* | 2/2011 | Drees | G05B 15/02 714/57 |
| 2011/0154119 | A1 | 6/2011 | Wang et al. | |
| 2014/0053025 | A1* | 2/2014 | Marvasti | G06F 11/079 714/37 |
| 2014/0316743 | A1* | 10/2014 | Drees | G05B 15/02 702/184 |
| 2014/0325291 | A1* | 10/2014 | Spivey | G05B 15/02 714/48 |
| 2015/0046123 | A1* | 2/2015 | Kato | G06F 11/079 702/183 |
| 2015/0355957 | A1 | 12/2015 | Steiner et al. | |
| 2016/0062459 | A1 | 3/2016 | Publicover et al. | |

OTHER PUBLICATIONS

Non-Final Office Action dated May 11, 2017 in U.S. Appl. No. 13/747,177, 22 pages.
Final Office Action dated May 18, 2017 in U.S. Appl. No. 14/266,839, 11 pages.

* cited by examiner

*Primary Examiner* — Jason B Bryan
(74) *Attorney, Agent, or Firm* — Shook, Hardy & Bacon, L.L.P.

(57) ABSTRACT

A continuous anomaly detection service receives data stream and performs continuous anomaly detection on the incoming data streams. This continuous anomaly detection is performed based on anomaly detection definitions, which define a signal used for anomaly detection and an anomaly detection configuration. These anomaly detection definitions can be modified, such that continuous anomaly detection continues to be performed for the data stream and the signal, based on the new anomaly detection definition.

20 Claims, 13 Drawing Sheets

CONFIGURATION OF CONTINUOUS ANOMALY DETECTION SERVICE

BACKGROUND

Many organizations such as businesses, associations, and governments employ complex information technology systems. Often, a system requires tens, hundreds, and even thousands of components such as web servers, application servers, databases, firewalls, routers, operating systems, and software applications. Each of these components may produce data relating to the operation of the component. In some instances, some portion of this data may be analyzed to identify, diagnose, and remedy problems within an information technology system. Errors messages, aberrant values, and other similar content within the produced data may indicate that a problem is occurring, and may be monitored automatically and by human technicians.

DETAILED DESCRIPTION

Figure 1:
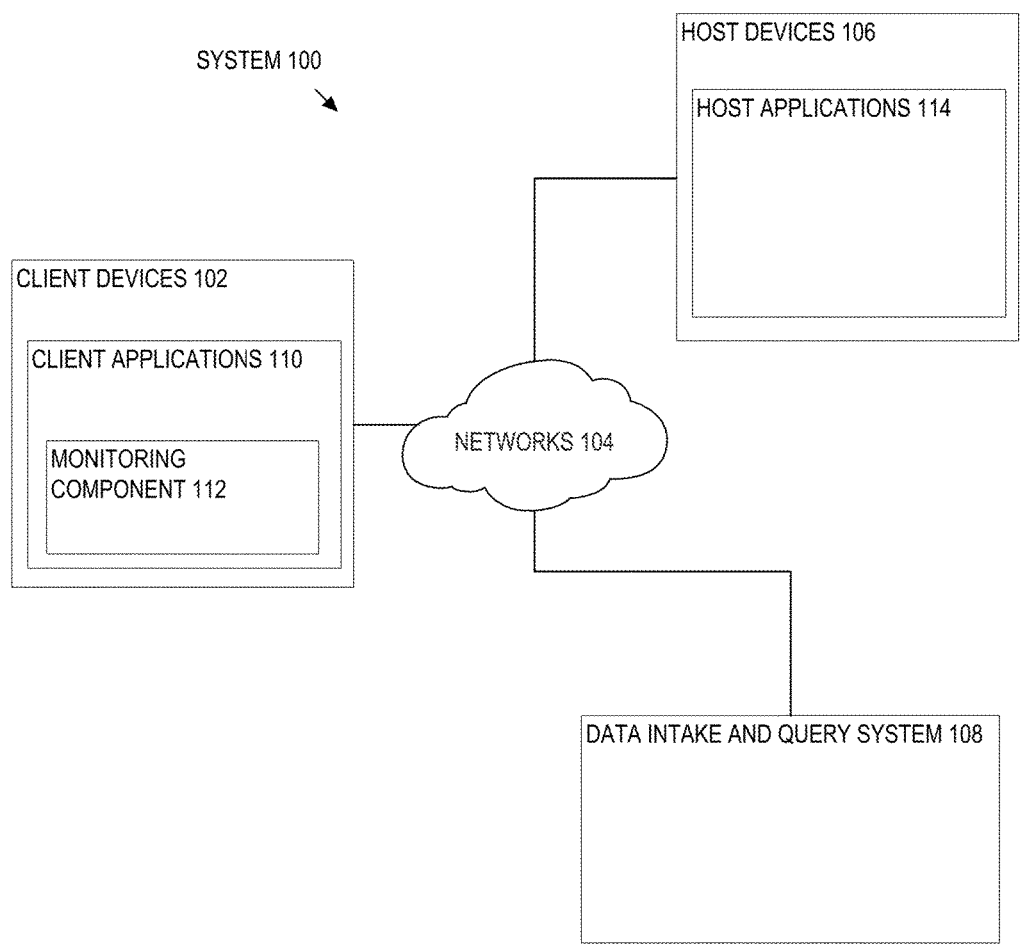
FIG. 1 illustrates a networked computer environment in which an embodiment may be implemented.

In at least one embodiment, computer-implemented method for configuring a continuous anomaly detection service comprises accessing a plurality of anomaly detection definitions, wherein each of the plurality of anomaly detection definitions comprises a signal and an anomaly detection configuration, and wherein each of the signals comprises a sequential set of data points. In an embodiment, the method also comprises receiving a request to modify a first anomaly detection definition of the plurality of anomaly detection definitions, wherein the first anomaly detection definition comprises a first signal and a first anomaly detection configuration, and updating the first anomaly detection configuration based on the request to modify. The method also comprises continuously determining an anomaly result for each of the plurality of anomaly detection definitions, wherein the anomaly result for the first anomaly detection definition is based on the updated first anomaly detection configuration.

In at least one embodiment, a non-transitory computer-readable storage medium comprises instructions stored thereon, which when executed by one or more processors, cause the one or more processors to perform operations that comprise accessing a plurality of anomaly detection definitions, wherein each of the plurality of anomaly detection definitions comprises a signal and an anomaly detection configuration, and wherein each of the signals comprises a sequential set of data points. In an embodiment, the instructions also cause the one or more processors to perform operations that comprise receiving a request to modify a first anomaly detection definition of the plurality of anomaly detection definitions, wherein the first anomaly detection definition comprises a first signal and a first anomaly detection configuration and updating the first anomaly detection configuration based on the request to modify. In an embodiment, the instructions also cause the one or more processors to perform operations that comprise continuously determining an anomaly result for each of the plurality of anomaly detection definitions, wherein the anomaly result for the first anomaly detection definition is based on the updated first anomaly detection configuration.

In at least one embodiment, a system for performing continuous anomaly detection comprises at least one memory having instructions stored thereon and at least one processor configured to execute the instructions. In an embodiment, the instructions cause the processor to access a plurality of anomaly detection definitions, wherein each of the plurality of anomaly detection definitions comprises a signal and an anomaly detection configuration, and wherein each of the signals comprises a sequential set of data points. In an embodiment, the instructions cause the processor to receive a request to modify a first anomaly detection definition of the plurality of anomaly detection definitions, wherein the first anomaly detection definition comprises a first signal and a first anomaly detection configuration. In an embodiment, the instructions cause the processor to update the first anomaly detection configuration based on the request to modify and continuously determine an anomaly result for each of the plurality of anomaly detection definitions, wherein the anomaly result for the first anomaly detection definition is based on the updated first anomaly detection configuration.

1.0. General Overview

In various embodiments described herein, data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, in one embodiment, machine data is generated by various components in the information technology (IT) environments, such as servers, sensors, routers, mobile devices, Internet of Things (IoT) devices, etc. In at least one embodiment, machine-generated data can include system logs, network packet data, sensor data, application program data, error logs, stack traces, system performance data, etc. In one embodiment, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
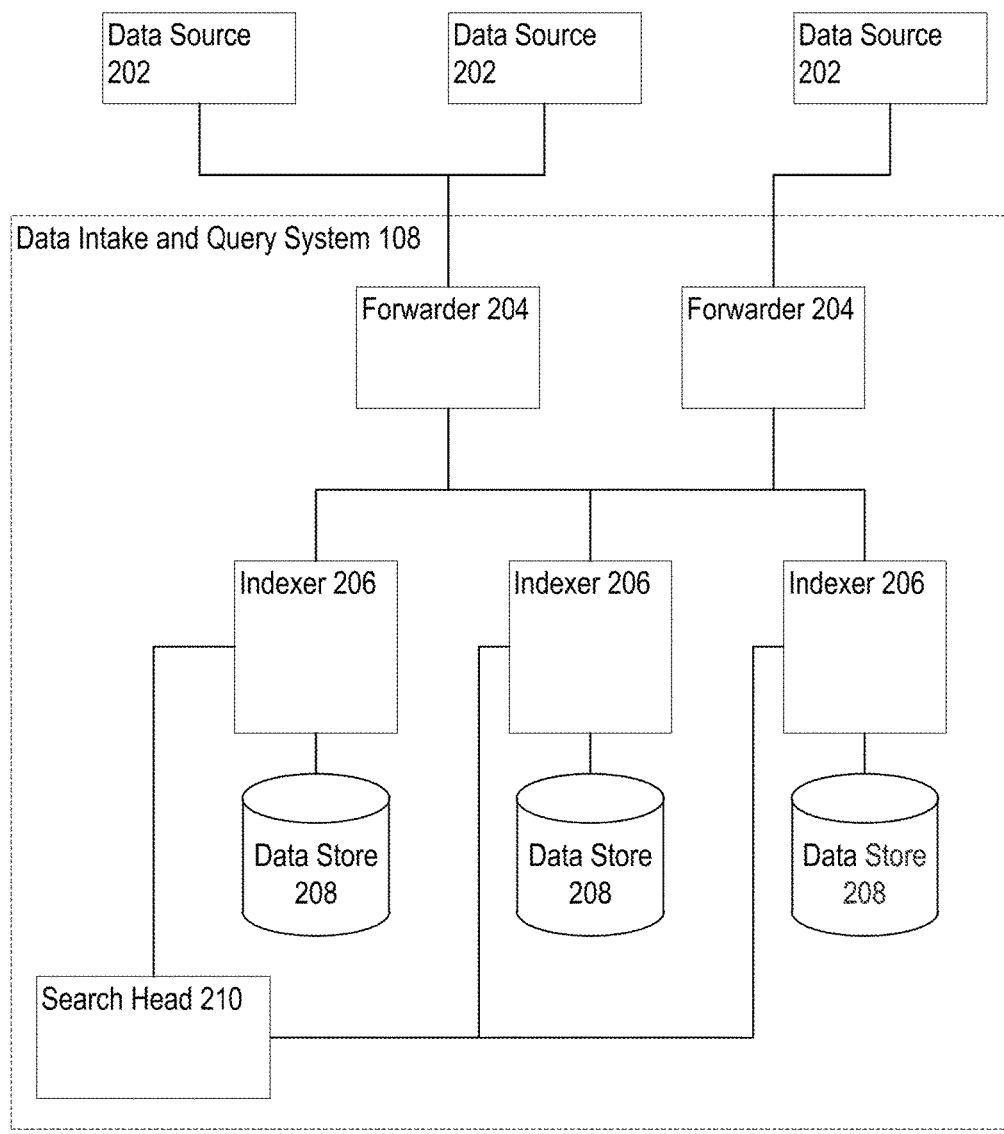
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
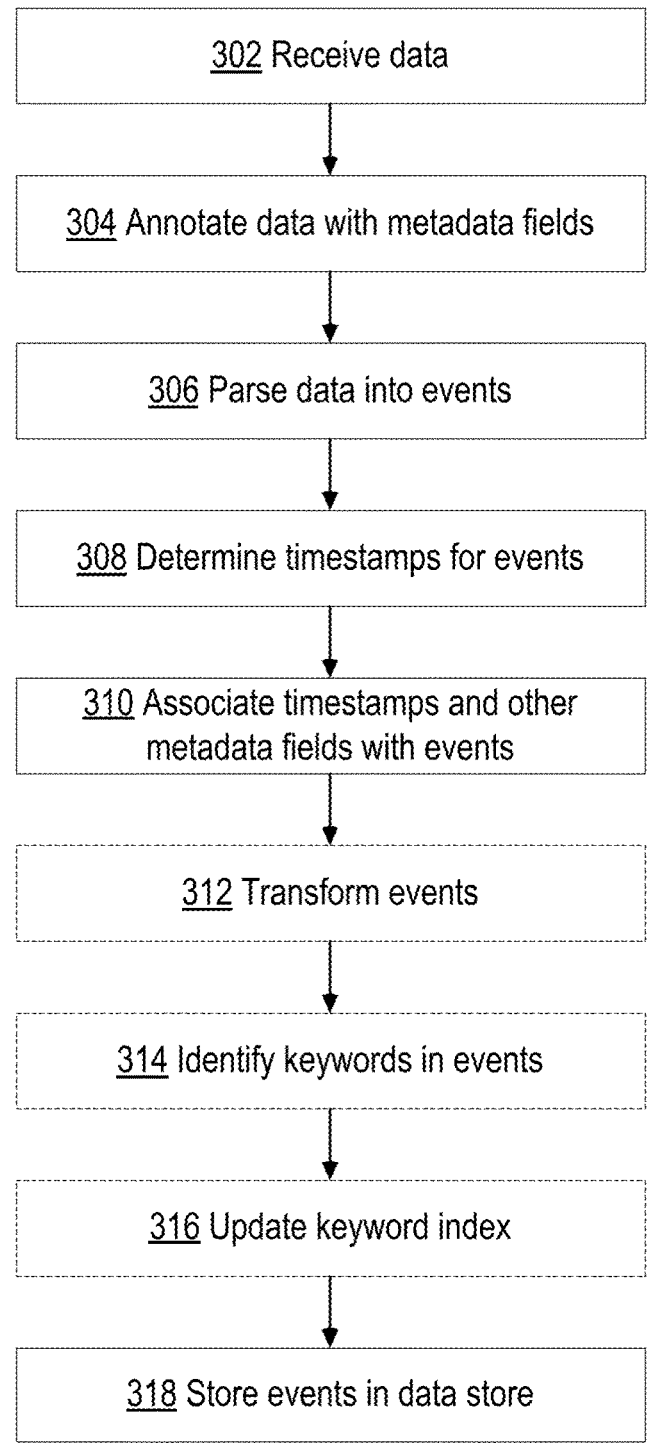
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

2.6. Query Processing

Figure 4:
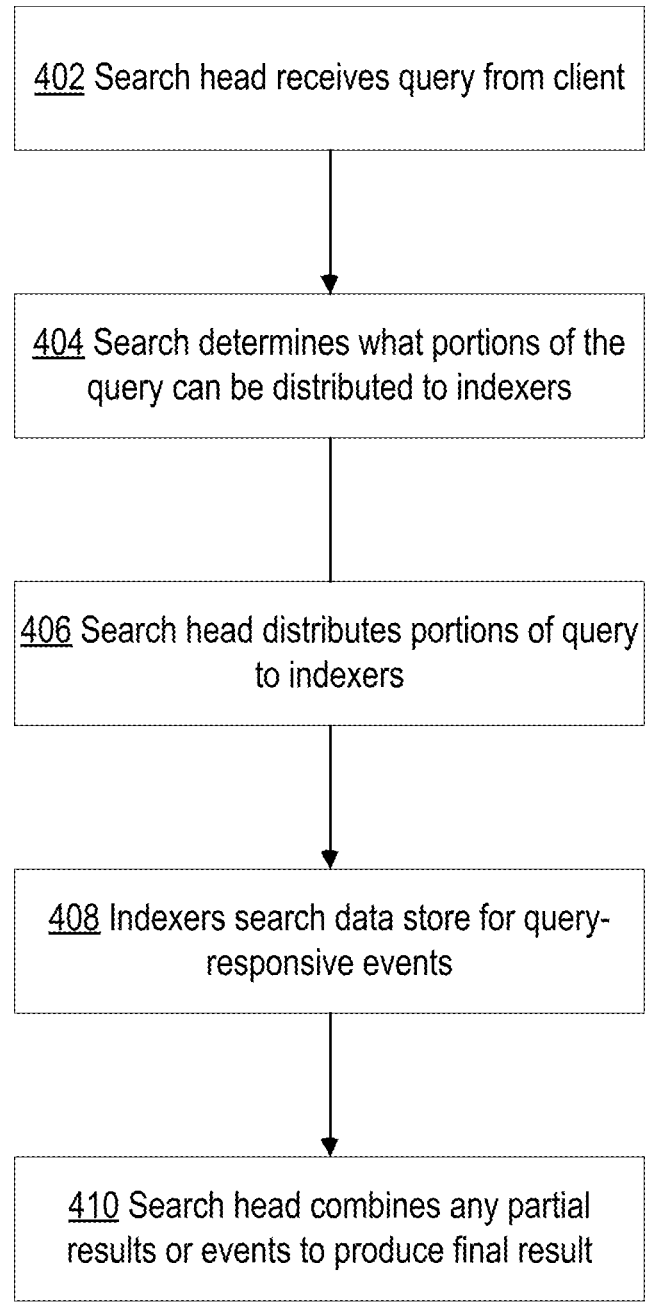
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

3.0. It Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may promi-nently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.1. Anomaly Detection

In some embodiments, anomaly detection may be a feature incorporated into technologies described herein and may enable users (e.g., IT managers operating a system such as SPLUNK® IT SERVICE INTELLIGENCE™) to identify when the values of data such as a KPI reflect anomalous behavior (e.g., an occurrence that is relatively less predictable and/or more surprising than previously received/identified KPI values). That is, it can be appreciated that in certain implementations defining and/or applying static thresholds to data such as KPI values (e.g., in order to identify KPI values that lie above and/or below such thresholds) may be effective in enabling the identification of unusual behavior, occurrences, etc. In certain circumstances, however, such thresholds may not necessarily identify anomalous behavior/occurrences, such as with respect to the deviation and/or departure of particular data such as a KPI value from a trend that has been observed/identified with respect to prior data values, as is described herein. For example, certain machine behavior, occurrences, etc. (e.g., as reflected in one or more KPI values) may not necessarily lie above or below a particular threshold. However, upon considering a current data (e.g., KPI values) in view of various trend(s) identified/observed in prior data values (e.g., training data such as historical KPI values, simulated KPI values, etc.), the current value, may nevertheless reflect anomalous behavior/occurrences (in that the current data (e.g., KPI) value, for example, deviates/departs from the identified trend).

It should be understood that while in certain implementations the referenced anomalies may correspond to behavior or occurrences as reflected in data (e.g., KPI) values that may be greater or lesser than an expected/predicted data (e.g., KPI) value (as described in detail below), in other implementations such anomalies may correspond to the absence or lack of certain behaviors/occurrences. For example, in a scenario in which certain data (e.g., KPI) values have been observed/determined to demonstrate some amount of volatility, upon further observing/determining that subsequent data (e.g., KPI) values are relatively less volatile, such behavior/occurrence can also be identified as anomalous (despite the fact that the data (e.g., KPI) value(s) do not fall above or below a particular threshold).

Figure 5:
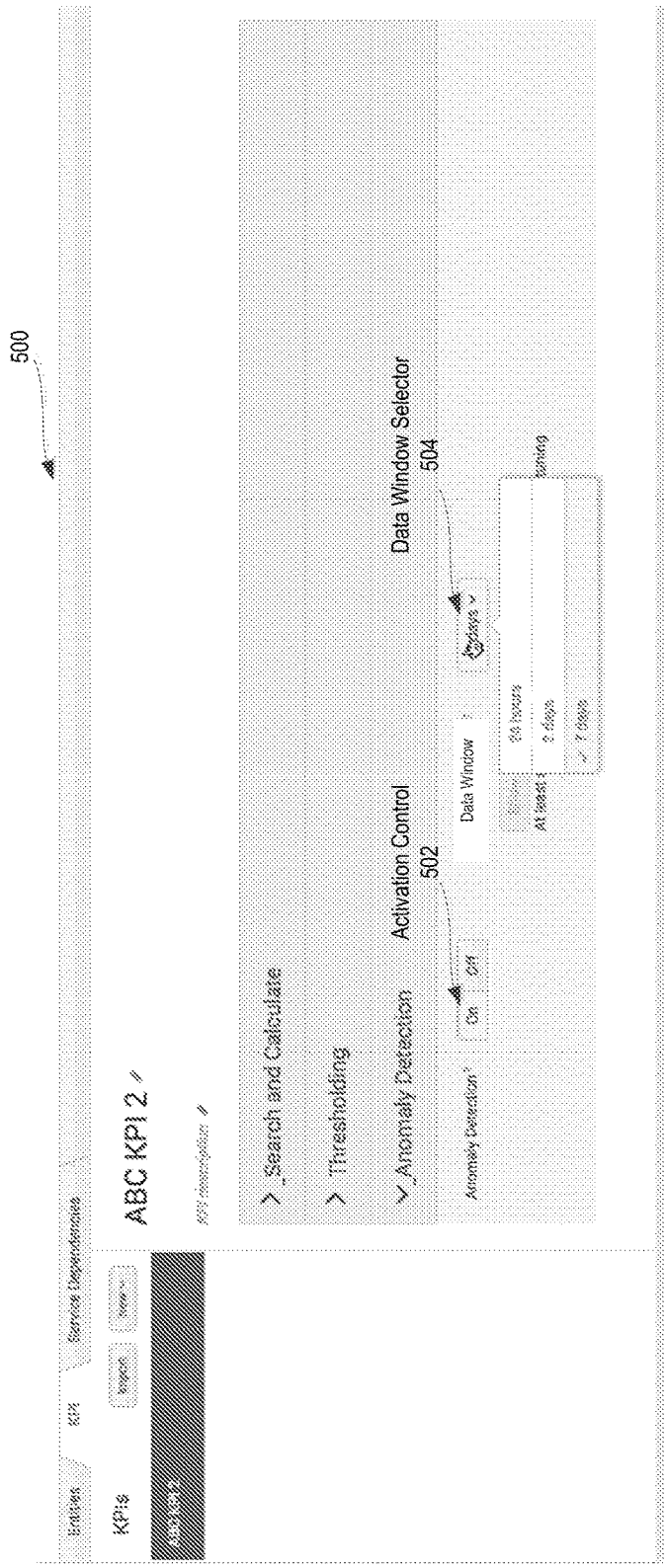
FIG. 5 illustrates an exemplary graphical user interface for anomaly detection in accordance with one or more embodiments of the present disclosure.

In an embodiment, FIG. 5 illustrates an exemplary GUI 500, in accordance with one or more embodiments of the present disclosure. It should be understood that GUI 500 (as depicted in FIG. 5) corresponds to a particular KPI (here, 'ABC KPI 2'), though in other implementations such a GUI may correspond to any other type of data, multiple data categories (e.g., KPIs), an aggregate or composite of data (e.g., KPI), etc. (e.g., for a cohesive anomaly detector that monitors a number of KPIs to identify changes in data between multiple KPIs). GUI 500 may include activation control 502 and data window selector 504. In an embodiment, activation control 502 can be, for example, a button or any other such selectable element or interface item that, upon selection (e.g., by a user), enables and/or otherwise activates the various anomaly detection technologies described herein (e.g., with respect to a particular KPI or KPIs). In an embodiment, upon activating anomaly detection via activation control 502, data window selector 504 and other user interface elements (not depicted) can be presented to the user via GUI 500.

In an embodiment, data window selector 504 can enable the user to define a window (e.g., a duration, number of data points, or time range) of data (e.g., KPI) to provide as a signal (e.g., a sequential set of data points) that will be used to perform anomaly detection. Different data may arrive from different sources and may be stored at different intervals (e.g., resulting in different resolutions). For each data category (e.g., KPI), an anomaly detection definition may have its own signal that is stored within a data queue. In an embodiment, by defining the data window that may be used for the anomaly detection definition associated with the particular data (e.g., KPI), the frequency with which data points may be provided to the signal (e.g., an interval between data points) may be determined, for example, based on the duration of the data defined by the data window selector and the number of data points that are available in a data queue for the anomaly detection definition. In some embodiments, a data queue size for the anomaly detection definition may be modified to accommodate different data window selections.

Although not depicted in FIG. 5, in some embodiments a selection input (e.g., a pull-down menu, radio button, etc.) may be provided to select between available anomaly detection procedures. Although any suitable anomaly detection procedure may be used for any suitable data source, in an embodiment, available anomaly detection procedures may include a trending anomaly detection procedure, a cohesive anomaly detection procedure, and a sparse anomaly detection procedure. In an embodiment, performing any anomaly detection procedure may provide an output such as an anomaly result. An anomaly result may be an output of the anomaly detection procedure, such as an anomaly value, an anomaly score, an anomaly definition, or an anomaly alert.

In an embodiment, a trending anomaly detection procedure may provide for analysis of anomalies within a single KPI over time, e.g., by comparing data points within a single signal for a single anomaly detection definition with other data points of the same signal. Trending anomaly detection may be performed on the data to determine whether any points (or set of points) within the sequential set of data points of the signal correspond to an anomaly. In this manner, a trending anomaly detection analysis may analyze not only the most recent data point or set of data points, but may continuously determine whether prior data points correspond to an anomaly based on the sequential set of data points of the signal that is currently within the data queue. In an embodiment, a sparse algorithm may operate on a single KPI in a similar manner to a trending algorithm, but may be optimized for sparse data sets that have few data points, for example by utilizing additional historical data points if the existing sequential set of data points for the data detection window for a signal is inadequate to perform anomaly detection.

In an embodiment, a cohesive anomaly detection procedure may analyze data from multiple KPIs as a cohesive detection group in order to identify whether one of the KPIs is functioning differently from the other KPIs of the cohesive detection group. Cohesive detection groups may be selected in any suitable manner, such as by a user selection (e.g., identifying data (e.g., KPIs) to analyze as a cohesive detection group from a user interface (not depicted)), automatically based on data (e.g., KPIs) that exhibit common trends over time, and based on a hybrid interface that allows for user selections among data (e.g., KPIs) that are automatically identified. Data points from the data (e.g., KPIs) in the cohesive detection group may be compared between data categories (e.g., KPIs), and anomalies may be detected when the comparative behavior of the data categories (e.g., KPIs) to each other (e.g., determined as an anomaly result such as anomaly scores) differs from the comparative behavior at other points within the sequential set of data for the data categories (e.g., KPIs). In an embodiment, the system may actively monitor anomaly detection definitions for data categories (e.g., KPIs) to identify data categories (e.g., KPIs) that are correlated, generate cohesive detection groups based on the monitoring, and identify anomalies for these cohesive detection groups.

Although anomaly detection may be determined in a variety of manners, in an exemplary embodiment the signal for each anomaly detection definition may be periodically analyzed as the data within the signal changes (e.g., based on new data points for the KPI being inserted into the signal and older data points being removed). In an exemplary embodiment, the signal (e.g., the entire sequential set of data points or some portion thereof) may be pre-processed, anomaly scores may be calculated for the signal, and the anomaly scores may be compared to one or more thresholds in order to determine whether an anomaly has occurred and what types of alerts should be provided in response to a detected anomaly.

In an embodiment, pre-processing may include any suitable processing for the signal, such as determining an analysis window, normalizing data points, resampling and/or interpolating data points, any other suitable pre-processing, or any combination thereof. Pre-processing may result in data points that are suitable for anomaly scoring, such as by modifying the resolution, magnitude, or other characteristics of the data points for the anomaly scoring algorithm. For a cohesive anomaly definition (e.g., an anomaly definition in which multiple KPIs are analyzed against each other), the data points associated with each data category (e.g., KPI) may be applied to a similar magnitude scale, a trend may be determined for each data category (e.g., KPI) (e.g., based on a rolling median), the noise in the data may be determined from the raw data and the trend, and the normalized data may be determined based on the noise and the trend.

In an embodiment, anomaly scoring may be determined based on a variety of statistical techniques, such as behavior modeling (e.g., using models like Holt-Winters or ARIMA), statistical distribution p-testing, non-parametric distribution comparison (e.g., Kullback-Leibler), or non-parametric distance functions (e.g. L1/Manhattan distance). For anomaly scoring for a trending-type anomaly detection definition, the data points are analyzed to determine the degree to which data points deviate from the signal under analysis. For anomaly scoring of a cohesive anomaly detection definition, the data points for each of the data categories (e.g., KPIs) may be compared to each other and analyzed based on the overall patterns of differences between the data points for the respective data categories (e.g., KPIs).

In an embodiment, determination of anomaly thresholds, analysis of those thresholds, and determinations of alerts may be performed based on an analysis of the signal as well as user inputs such as sensitivity settings. In some embodiments, a base threshold may be determined based on statistical techniques, such as by determining standard deviations between data points, determining a discrete gradient for the standard deviations, and setting a threshold based in part on the discrete gradient. In some embodiments, the threshold may be adjusted based on a user input such as sensitivity. Anomalies may be detected based on comparison of anomaly scores with the anomaly threshold, and alerts may be generated based on the comparison and alert settings.

Figure 6:
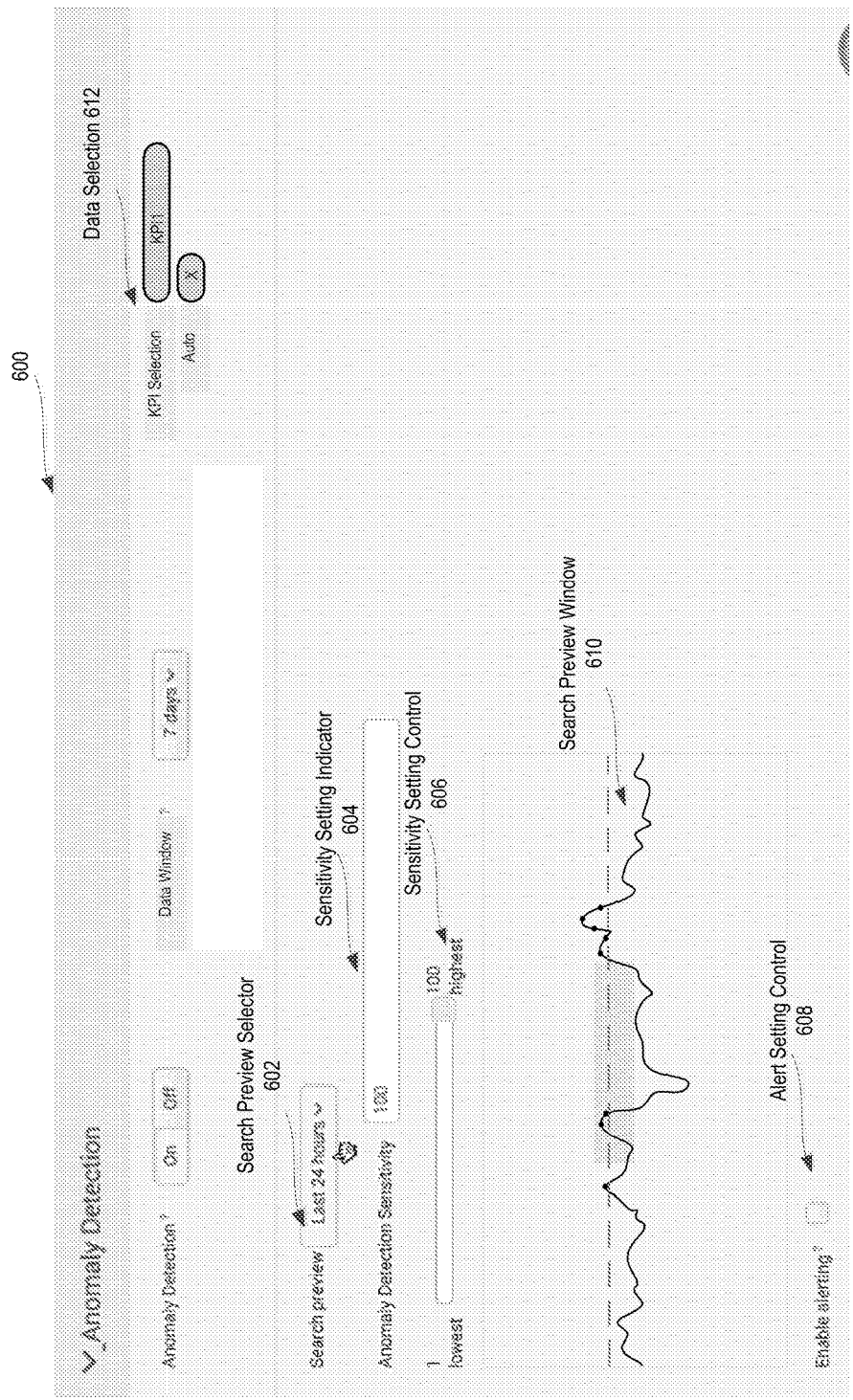
FIG. 6 illustrates an exemplary graphical user interface in accordance with one or more embodiments of the present disclosure.

FIG. 6 illustrates an exemplary GUI 600 in accordance with one or more embodiments of the present disclosure. Although GUI 600 may include any suitable user interface elements, in an embodiment GUI 600 may include search preview selector control 602, sensitivity setting indicator 604, sensitivity setting control 606, alert setting control 608, search preview window 610, and data selection 612. Search preview selector control 602 can be, for example, a drop down menu or any other such selectable element or interface item that, upon selection (e.g., by a user) enables a user to define or select a chronological interval with respect to those anomaly scores (and their corresponding data (e.g., KPI) values) that have been identified as anomalies are to be presented (e.g., within search preview window 610), as described herein.

In an embodiment, sensitivity setting control 606 can be, for example, a selectable element (e.g., a movable slider, a pull-down menu, or a numerical text input) or interface item that, upon selection (e.g., by a user), enables a user to select or define a setting that dictates the sensitivity (e.g., between '1,' corresponding to a relatively low sensitivity and '100,' corresponding to a relatively high sensitivity, the presently selected value of which is reflected in sensitivity setting indicator 604) with respect to which anomaly scores associated with data (e.g., KPI) values are to be identified as anomalies. That is, in an embodiment, as described herein, an anomaly value may be calculated for some or all data points within a sequential set of data points of a signal that is used for anomaly detection. In an embodiment, the sensitivity setting indicator may be utilized to establish thresholds for anomaly scores that will be identified as an anomaly. Accordingly, the referenced sensitivity setting can dictate/define an anomaly threshold which can be, for example, a threshold by which such deviations are to be considered/identified as anomalies. For example, a sensitivity setting of '10' may correspond to the 10th percentile of the referenced deviations from historical anomaly scores. Accordingly, based on such a selection, all those anomaly scores that are above the 10th percentile with respect to their deviation from the non-anomalous data points within the signal would be identified as anomalies. By way of further example, a sensitivity setting of '99' may correspond to the 99th percentile of the referenced deviations from the other data points within the signal. Accordingly, based on such a selection, only those anomaly scores that are above the 99th percentile with respect to their deviation from other data points would be identified as anomalies.

In an embodiment, providing the referenced sensitivity setting control 606, the described technologies can enable a user to adjust the sensitivity setting (thereby setting a higher or lower error threshold with respect to which anomaly scores are or are not identified as anomalies) and to be presented with real-time feedback (via search preview window 610) reflecting the underlying data such as anomaly scores or underlying data (e.g., KPI) values below. An exemplary anomaly detection preview for a particular signal is depicted in search preview window 610, with anomaly scores values scaled along the ordinate of the search preview window 610 and anomaly scored depicted versus time (e.g., along the abscissa of the search preview window 610). In an embodiment, a depiction of an anomaly score threshold and data points of the signal that fall outside of that threshold are depicted as a dashed line and as points above that dashed line, respectively.

In an embodiment, alert setting control 608 can be, for example, a selectable button, checkbox, etc., or any other such selectable element or interface item that, upon selection (e.g., by a user) enables a user to select or define whether or not various alerts, notifications, etc. (e.g., email alerts, notable events, etc.), are to be generated and/or provided, e.g., upon identification of various anomalies. Although not depicted in FIG. 6, once an alert setting control is selected, a variety of user interfaces may be provided to customize alerts, e.g., based on types of alerts, recipients, contents of alerts, severity thresholds for different types of alerts, etc.

In an embodiment data selection 612 may provide user interface elements for selecting particular additional data to monitor with the anomaly (e.g., based on selections from a search window, pull-down menu, or selection boxes) and for automatically identifying data to monitor with an anomaly. In some embodiments, in addition to identifying an anomaly for related data, the system may also identify other data (e.g., metric data, KPI data, raw machine data) from the data (e.g., KPI) system or from other data sources or systems, that relates to an identified anomaly. In an embodiment, when an anomaly is identified, particular data may be searched (e.g., based on selected data) to determine if it is correlated to the anomaly, or such search may automatically be performed for a subset of data (e.g., based on selecting "Auto" from data selection 612. In this manner, it may be possible to identify the impact that a particular anomaly has on the operation of the monitored system (e.g., an IT system).

Figure 7:
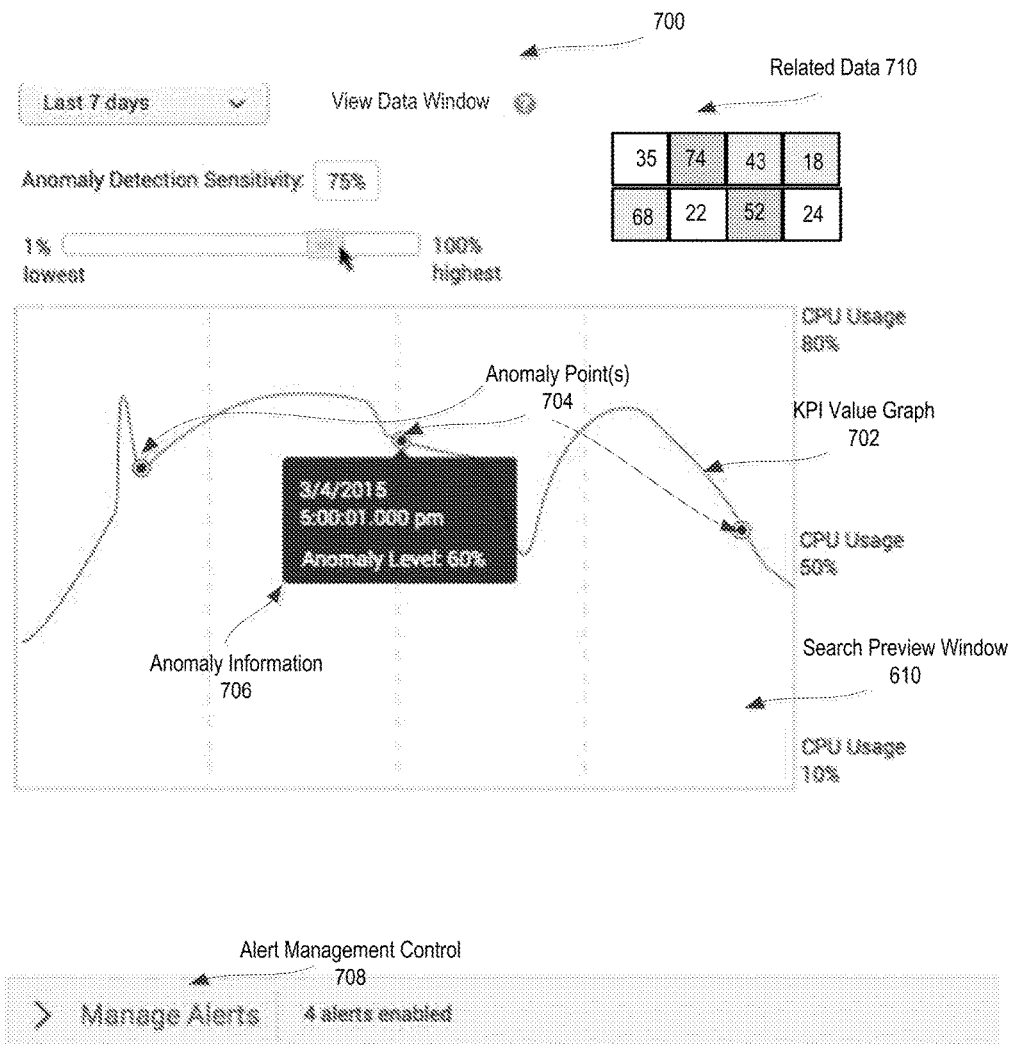
FIG. 7 illustrates an exemplary graphical user interface in accordance with one or more embodiments of the present disclosure.

FIG. 7 illustrates an exemplary GUI 700 for monitoring in accordance with one or more embodiments of the present disclosure. In an embodiment, GUI 700 may include search preview window 610 (as described with respect to FIG. 6), KPI value graph 702, anomaly point(s) 704, anomaly information 706, alert management control 708, and related data display 710. In the exemplary embodiment of FIG. 7, the values utilized for the ordinate of the search preview window may be data (e.g., KPI) values (compared to anomaly scores, as depicted in FIG. 6) such that the value graph is a KPI value graph 702 (compared to the anomaly score value graph of FIG. 6). KPI value graph 702 can be, for example, a graph that depicts or represents KPI values (e.g., 'CPU usage') over the chronological interval defined by search preview selector control 602 (e.g., the past 24 hours). It should be understood that, in certain implementations, the referenced chronological interval may be adjusted (e.g., zoomed-in, zoomed-out) by the user, e.g., at run time (such as by providing an input via search preview selector control 602). In doing so, only a portion of the chronological interval may be displayed in search preview window 610, or alternatively, an additional time period can be added to the chronological interval, and the resulting extended chronological interval can be displayed in search preview window 610. In an embodiment, anomaly point(s) 704 can be visual identifiers (e.g., highlighted or emphasized points or graphical indicators) depicted along the graph. The placement of such anomaly points 704 within search preview window 610 can reflect the point in time in which the underlying data (e.g., KPI) (with respect to which the anomaly was detected) occurred within the chronological interval (e.g., the past 24 hours). For example, the left-most area of search preview window 610 can correspond to the beginning of the referenced 24-hour period while the right-most area of search preview window 610 can correspond to the end of the referenced 24-hour period.

As described above, in an embodiment, the anomaly point(s) 704 that are displayed along KPI value graph 702 are identified based on the sensitivity setting provided by the user (via sensitivity setting control 604). Accordingly, as the user drags the slider (that is, sensitivity setting control 604) towards the left, thereby lowering the sensitivity setting (that is, the error threshold by which anomaly scores are to be determined to be anomalies with respect to their deviation from historical anomaly scores for the data (e.g., KPI)), relatively more anomalies are likely to be identified. Conversely, as the user drags the slider (that is, sensitivity setting control 606) towards the right, thereby raising the sensitivity setting (that is, the error threshold by which anomaly scores are to be determined to be anomalies with respect to their deviation from historical anomaly scores for the data (e.g., KPI)), relatively fewer anomalies are likely to be identified. In doing so, the user can actively adjust the sensitivity setting via sensitivity setting control 606 and be presented with immediate visual feedback regarding anomalies that are identified based on the provided sensitivity setting.

In an embodiment, anomaly information 706 can be a dialog box or any other such content presentation element within which further information can be displayed, such as with respect to a particular anomaly. That is, having identified various anomalies (as depicted with respect to anomaly points 704), it may be useful for the user to review additional information with respect to the identified anomalies. Accordingly, upon selecting (e.g., clicking on) and/or otherwise interacting with (e.g., hovering over) a particular anomaly point 704, anomaly information 706 can be presented to the user. In certain implementations, such anomaly information 706 can include the underlying data (e.g., KPI) value(s) associated with the anomaly, the anomaly score, a timestamp associated with the anomaly (reflecting, for example, the time at which the KPI had an anomalous value), and/or any other such underlying information that may be relevant to the anomaly, KPI, etc. In doing so, the user can immediately review and identify information that may be relevant to diagnosing/identifying and/or treating the cause of the anomaly, if necessary.

It should also be noted that, in certain implementations, the referenced anomaly information 706 dialog box (and/or one or more elements of GUI 700) can enable a user to provide various types of feedback with respect to various anomalies that have been identified and/or presented (as well as information associated with such anomalies). Examples of such feedback that a user may provide include but are not limited to feedback reflecting that: the identified anomaly is not an anomaly, the identified anomaly is an anomaly, an anomaly score/corresponding data (e.g., KPI) value that was not identified as an anomaly should have been identified as an anomaly, an anomaly score/corresponding data (e.g., KPI) value that was not identified as an anomaly is, indeed, not an anomaly, the identified anomaly is not as anomalous as reflected by its corresponding anomaly score, the identified anomaly is more anomalous than is reflected by its corresponding anomaly score, the identified anomaly together with one or more nearby (e.g., chronologically proximate) anomalies are part of the same anomalous event, the identified anomaly is actually two or more distinct anomalies, etc. in certain implementations, the referenced feedback may originate from a multitude of sources (similar to the different sources of training data described herein). For example, labeled examples of anomalies and non-anomalies can be gathered from similar but distinct systems or from communal databases.

It should be further noted that while in certain implementations (such as those described herein) the referenced feedback can be solicited and/or received after an initial attempt has been made with respect to identifying anomalies, in other implementations the described technologies can be configured such that a training phase can first be initiated, such as where a user is presented with some simulated or hypothetical anomalies with respect to which the user can provide the various types of feedback referenced above. Such feedback can then be analyzed/processed to gauge the user's sensitivity and/or to identify what types of anomalies are (or aren't) of interest to them. Then, upon completing the referenced training phase, a detection phase can be initiated (e.g., by applying the referenced techniques to actual data (e.g., KPI) values, etc.). Moreover, in certain implementations the described technologies can be configured to switch between training and detection modes/phases (e.g., periodically, following some conditional trigger such as a string of negative user feedback, etc.).

Moreover, in certain implementations the described technologies can be configured to detect/identify anomalies in/with respect to different applications. For example, it can be appreciated that with respect to different user roles, e.g., an IT manager and a security analyst, anomalies identified in one application may not be considered anomalies in another application. Thus, depending on, for example, the role of the user, different anomalies may be identified. In certain implementations, the feedback provided via the slider and/or one of the mechanisms described above can further impact the active application or some subset of applications (but not other(s)).

In an embodiment, alert management control 708 can be, for example, a selectable element or interface item that, upon selection (e.g., by a user), enables a user to further manage various aspects of alerts, notifications, etc. (e.g., email alerts, notable events, etc., as are described herein) that are to be generated and/or provided, e.g., upon identification of various anomalies.

In an embodiment, related data 710 may provide a display of data that is associated with an anomaly. As described herein, at data selection 612 a user may select data to monitor along with an anomaly detection definition, and in some embodiments, may cause the system to automatically determine other data associated with an anomaly. Related data 710 display may provide a depiction of this related data. In an embodiment, the related data 710 may include values (e.g., KPI values) and may provide visual indicators (e.g., coloring or shading) based on thresholds or other comparison values. The display may correspond to a point of interest for the KPI value graph (e.g., based on a user selecting a point or hovering a cursor over a point).

Figure 8:
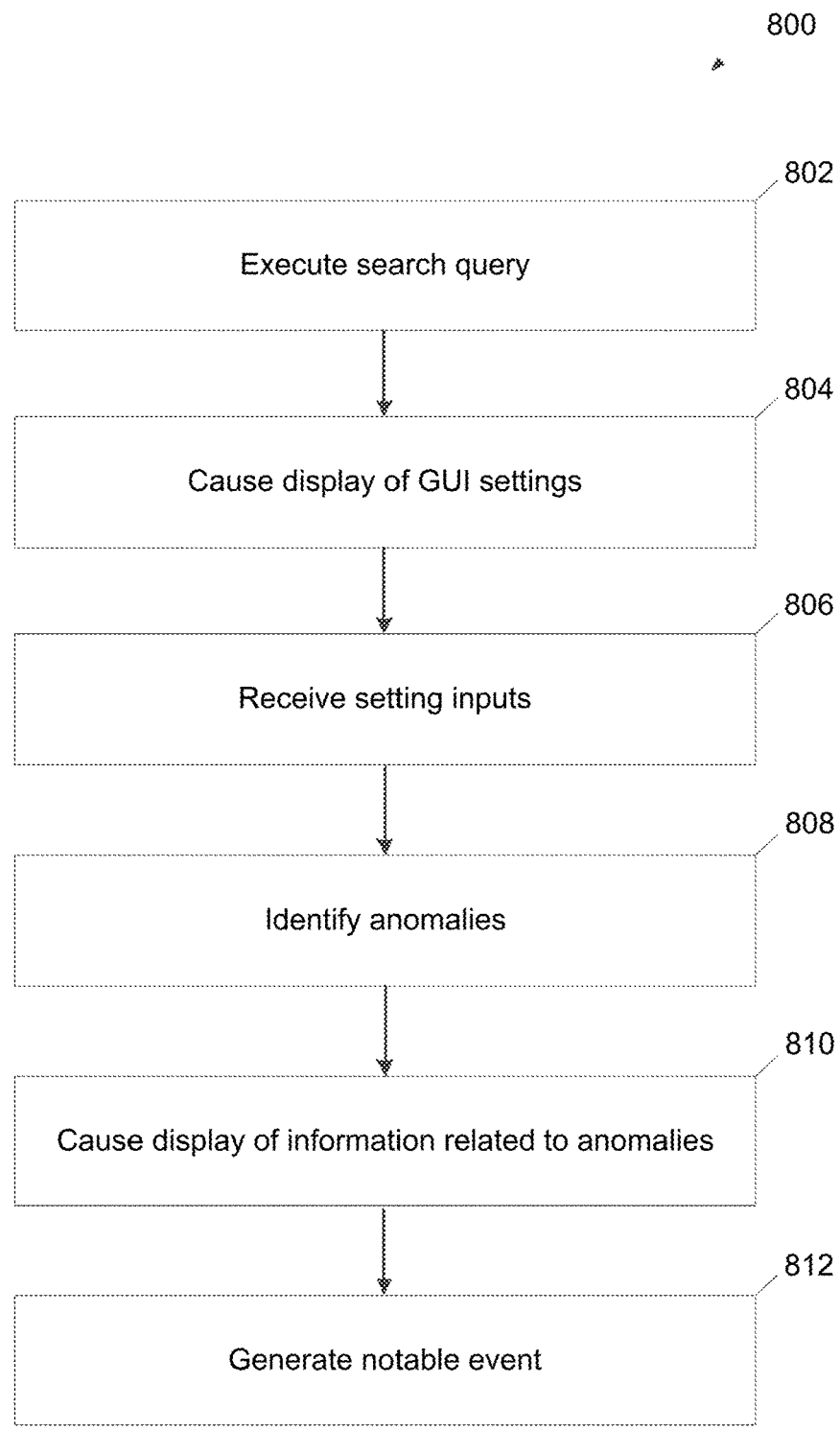
FIG. 8 is a flow diagram depicting exemplary steps in accordance with one or more embodiments of the present disclosure.

FIG. 8 is a flow diagram depicting exemplary steps 800 for anomaly detection in accordance with one or more embodiments of the present disclosure. Method 800 may be performed by processing logic that may comprise hardware (circuitry, dedicated logic, etc.), software (such as the one run on a general purpose computer system or a dedicated machine), or a combination of both. In one implementation, the method 800 may be performed by a client computing machine. In another implementation, the method 800 may be performed by a server computing machine coupled to the client computing machine over one or more networks.

Although the steps of FIG. 8 are generally described in the context of an anomaly detector for KPI data, it will be understood that they may apply equally to other anomaly detection applications based on other data types. The steps depicted by FIG. 8 are provided for illustrative purposes only; those skilled in the art will understand that additional steps may be included, that one or more steps may be removed, and that the ordering of the steps of FIG. 8 may be modified in any suitable manner. It will be understood that while particular hardware, software, system components, search techniques, and anomaly detection procedures may be described in the context of FIG. 8, that the steps described herein are not so limited.

Method 800 may begin at block 802 when the computing machine may execute a search query, such as over a period of time. In certain implementations, the referenced search query can be executed repeatedly, such as over a period of time and/or based on a frequency and/or a schedule. In doing so, values for a key performance indicator (KPI) can be produced. In certain implementations, such a search query can define the KPI. The referenced search query can derive a KPI value indicative of the performance of a service at a point in time or during a period of time. Such a value can, for example, be derived from machine data, such as machine data pertaining to one or more entities that provide the service, as is described herein. In certain implementations, such machine data may be produced by two or more sources. Additionally, in certain implementations, such machine data may be produced by another entity. Moreover, in certain implementations, such machine data may be stored as time-stamped events (each of which may include a segment of raw machine data). Such machine data may also be accessed according to a late-binding schema. Once a KPI is identified for a search query, and other data related to anomaly detection for a KPI is provided (e.g., a data window), a signal may be acquired for the KPI as described herein and an anomaly definition may be created.

At block 804, a graphical user interface (GUI) enabling a user to indicate settings for anomaly detection definition of the KPI, such as a sensitivity setting and related data settings. For example, as described herein with respect to FIGS. 5-7, upon activating activation control 502, a sensitivity setting control 606 and a data selection control 612 can be displayed. As described above, sensitivity setting control 606 can enable a user to define an error threshold above which, for example, a computed anomaly score (which corresponds to one or more underlying KPI values) is to be identified as an anomaly (and below which such an error is not to be identified as an anomaly). In some implementations, sensitivity setting control 606 can be a slider. Data selection control 612 can allow for a selection of particular related data to monitor, as well as the enablement of automatic detection of other related data that may be determined to be correlated or otherwise related to anomalies for the KPI at issue.

At block 806, the user inputs can be received. In certain implementations, such user input can be received via the GUI (e.g., sensitivity setting control 606 and data selection setting 612). Moreover, in certain implementations, such input can indicate the sensitivity setting desired by the user (e.g., an error threshold above which a computed anomaly score is to be identified as an anomaly and below which such an error is not to be identified as an anomaly). In some implementations, the user input can be received when the user moves the slider to a certain position. As described herein, the data selection setting may include identifying related data via a search, selection box, or pull down, as well as selection of automatic monitoring.

At block 808, zero or more of the values can be identified as anomalies. In certain implementations, such values can be identified as anomalies based on the settings for the anomaly detection definition, such as a sensitivity setting indicated by user input (e.g., via sensitivity setting control 606), a data window for the anomaly definition, the anomaly detection procedure for the anomaly definition, and any other suitable inputs.

At block 810, a GUI that includes information related to the values identified as anomalies may be provided. In certain implementations, the information related to the values identified as anomalies can include information such as an anomaly value graph, KPI value graph, detailed anomaly information, a count of the anomalies, related data information, and other suitable information related to the presence or characteristics of an anomaly. For example, a display of a graph that includes information related to any values identified as anomalies can be adjusted. In certain implementations, such a display can be adjusted based on the user input indicating the sensitivity setting. For example, as described in detail with respect to FIGS. 5-7, upon receiving various sensitivity setting inputs via sensitivity setting control 606, automatic (without any user input other than the sensitivity setting input) identification of anomalies can be repeated and the graph as displayed in search preview window 610 can be dynamically adjusted, e.g., with respect to the quantity, position, etc., of various anomaly points 704 (and their corresponding information). Related data can display information such as scores, thresholds, and visual indicators.

At block 812, an alert can be generated. The alert may be generated based on the identified anomalies and the alert settings provided by a user (e.g., based on alert setting control 608 and alert management control 708).

3.2. Continuous Anomaly Detection

In some embodiments, the anomaly detection service may be implemented as a continuous anomaly detection service. As described herein, continuous anomaly detection can be applied to a number of incoming data streams that may include real-time or near real-time data provided from data sources such as components of an IT system. In some embodiments, processing may have been applied to the data streams prior to being provided as data streams to the continuous anomaly detection search. Exemplary processing that may be applied include any suitable portion of indexing and KPI processing as described herein that is performed prior to storage in a data store. Thus, rather than accessing a portion of data points from a data store each time an anomaly detection analysis is performed, and analyzing the accessed data points, a plurality of signals may be continuously generated and stored for each KPI that is to be analyzed by the anomaly detector, based on data points that are most recently received from the data streams. Anomaly detection is continuously performed on this most recently received data, e.g., by performing anomaly detection on the most recently received data points based on the other data points of the signal. In an embodiment, as data points continue to be provided from the incoming data streams, each of the signals may be updated with data points that correspond to the particular KPI, with earlier data points that now fall outside of a data window under analysis being removed from the sequential set of data points of the signal. Each signal may then persist and be continuously updated as new data points are received through the continuous input from incoming data streams. Anomaly detection may be performed continuously with each update of most recently received data points. An example of such anomaly detection is provided in FIG. 9, which depicts exemplary continuous anomaly detection in accordance with some embodiments of the present disclosure.

Figure 9:
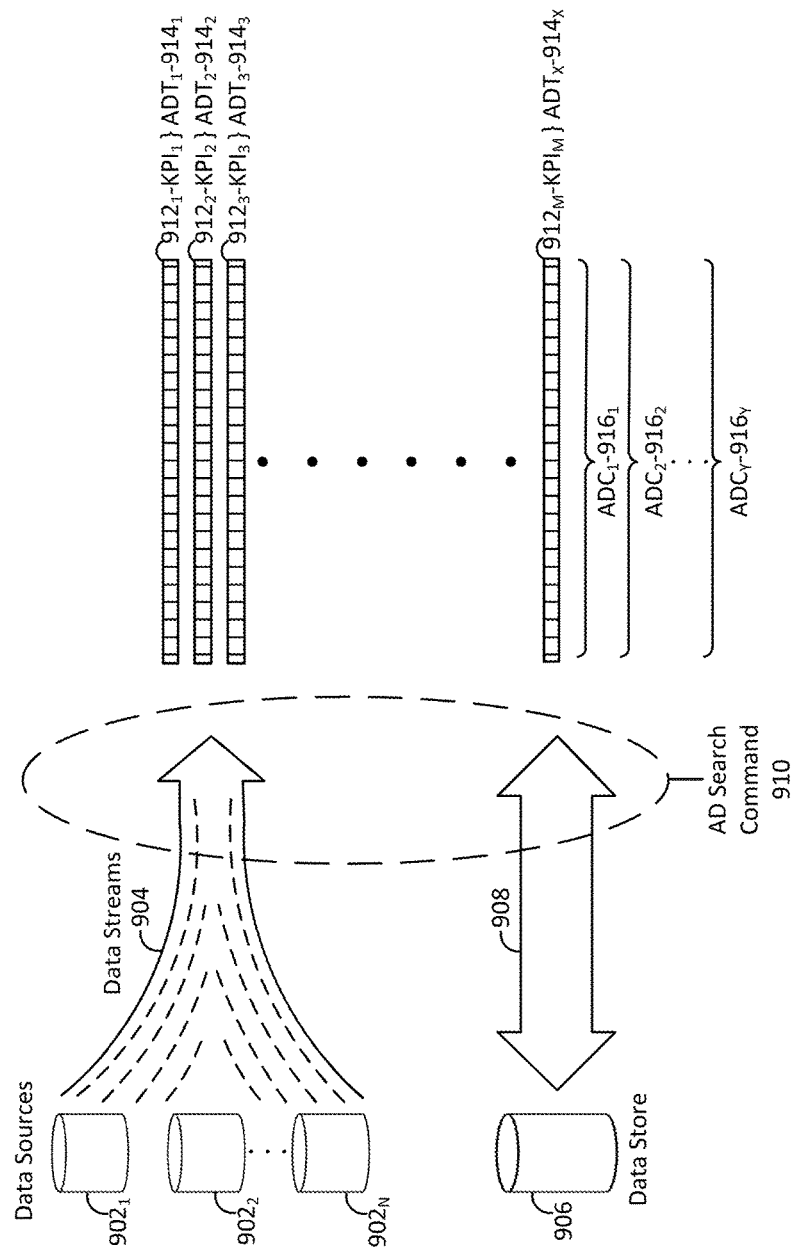
FIG. 9 is a block diagram depicting exemplary anomaly detection in accordance with some embodiments of the present disclosure.

As is depicted in FIG. 9, in an embodiment, inputs for anomaly detection may include a plurality of data streams 904 provided by a plurality of data sources $902_1$-$902_N$. Each data source may provide numerous data streams 904 (e.g., tens, hundreds, or thousands) representing different aspects of data that is provided by the data source to a data intake and query system. In some embodiments, the data streams may represent information relating to the operation of an IT system as described herein, and may be provided periodically or in some embodiments, in real time, such that in most instances the data of a received data stream is provided in the order that the underlying data is created.

In some embodiments historical data 908 from a data store 906 may be used for purposes of providing historical data for a signal. Historical data 908 may correspond to a lengthy storage of historical data in data store 906 (e.g., such as a data intake and storage system), which may typically persist indefinitely unless data is intentionally deleted. Historical data 908 may be accessed for a variety of purposes to assist in anomaly detection, such as to pre-load or backfill data points into the signals.

In an exemplary embodiment of pre-loading, when an anomaly definition is initially configured, it may be desired to access a prior store of data (e.g., historical data 908) to establish the necessary number of the sequential set of data points in the first instance, rather than waiting for the amount of time it would take for the necessary amount of data to be established from incoming data streams 904 (i.e., based on each data point of a data stream being received by the signal at a certain interval, until a necessary number of data points for anomaly detection of the signal is received). In an embodiment, the historical data 908 may be provided as data points for the signal, in an order such that the most recent data points are provided at the beginning of the signal (e.g., at the position within the signal that new data points from a data stream 904 will be received). In an embodiment, a number of data points of historical data 908 may be accessed and the historical data may be sequenced and reordered prior to providing the historical data 908 as the sequential set of data points, Once the necessary number of data points (e.g., a number of data points necessary to fill a signal, or a lesser number of data points required to perform anomaly detection) for a signal are received as historical data 908 from the data store, the signal can begin to be populated with newly received data points of a data stream 904 from the data sources $902_1$-$902_N$.

In an exemplary embodiment of backfilling, it may be determined that the data within an existing signal is incomplete (e.g., as a result of transmission or receiving errors of the data being provided by the data stream 904) or that a change to the signal is required (e.g., due to a change in the anomaly detection configuration). Because the same data streams are also being provided for storage at data store 906, any such missing, corrupted, aberrant, or changed data may be remedied or replaced based on accessed stored data. In an embodiment of replacing data points of a signal, target data points within the signal may be identified for replacement and replaced by historical data points.

In an embodiment, signals may be established and updated based on an anomaly detector search command 910. The anomaly detector search command may perform searches on incoming data streams 904 based on anomaly detection configurations provided for each of a plurality of anomaly detection definitions. In an embodiment, an anomaly detection configuration of an anomaly detection definition may provide information that is necessary to establish and configure the sequential set of data points of a signal (or in the case of a cohesive anomaly detection procedure, a plurality of signals), update signals based on incoming data streams 904, perform pre-loading or back-filling of signal based on historical data 908, dictate anomaly detection procedures associated with the anomaly detection definition and one or more signals, provide configuration parameters for the signals and anomaly detection procedures (e.g., data window length, resolution, algorithms, thresholds, sensitivity, and alerts), and any other suitable information relating to a definition. In an embodiment, the anomaly detection configurations may have a common data structure. The common data structure may allow for the anomaly detection configurations to be accessed, implemented, invoked, and updated in a similar manner. Exemplary elements of the common data structure may include common configuration parameters, common scaling, common storage, and common naming conventions.

In an embodiment, anomaly detection search command 910 may be applied to the incoming data streams 904 in order to extract data points for the signals of the anomaly detection system. In an embodiment, a search command may be generated based on the types of data that are required for the signals by the anomaly detection definitions, based on the anomaly detection configurations. The search may be run on a regular basis (e.g., periodically), relevant data signals may be identified from the plurality of received data signals based on information associated with the data stream (e.g., KPIs associated with an anomaly detection configuration that correspond to the information of a data signal or signals), a new data point or new data points may be extracted from each data stream that is associated with a signal, and the signal may be updated based on the new data point or data points. If, as described herein, a data queue associated with a signal is full, a corresponding number of data points (e.g., the oldest data points in the sequential set of data points of the signal) may be removed from the signal. The anomaly detection search command 910 may be run as a single search command including parameters for searching all of the incoming data streams, or in some embodiments, as a plurality of search commands (e.g., for different data sources $902_1$-$902_N$, different KPI types, different data windows, different data frequencies, different anomaly detection procedures, etc.).

An exemplary invocation of a search command may be " . . . |mad context=context_a| . . . ", which may provide an indication that the "AD Service" (mad command) should start and use all of the signal and algorithm configurations associated with the "AD Service Context" named "context_a". An exemplary full search (e.g., a SPL search) using the mad command may be a search such as "index=metric_index|mad context=context_a|collect index=ad_output", in which "index=metric_index" is a base search to select a set of search results (e.g., events from a Splunk search) containing metric data to operate on, in which "|mad context=context_a|" is the invocation of the continuous anomaly detection service for a specific configuration context, and in which "|collect index=ad_output|" instructs the system to save the output of the continuous anomaly detection service into a separate index "ad_output".

In an embodiment, the result of the anomaly detection search command 910 may be data points extracted from the incoming data streams, each directed at particular signals $912_1$-$912_M$. Although any suitable data may be represented within signals $912_1$-$912_M$, in an embodiment, each of the signals $912_1$-$912_M$ may be associated with a KPI, e.g., $KPI_1$-$KPI_M$. In this manner, the anomaly search command may be structured in a manner that allows for simplified searching of the incoming signal stream 904, e.g., based on established KPIs that a signal may be associated with. The relationship between a KPI (e.g., $KPI_1$-$KPI_M$) and a signal (e.g., $912_1$-$912_M$) may be established and stored as anomaly detection configuration information for an anomaly detection definition.

In an embodiment, each signal $912_1$-$912_M$ may be established and refreshed based on the anomaly detection configuration of the anomaly detection definition associated with the signal. As described herein, the anomaly detection configuration may define signal parameters such as a data window, refresh rate, data point frequency, resolution, data scaling, and other relevant information that defines the manner that data is stored in a particular signal. Signals $912_1$-$912_M$ may have the same or varied storage capacity based on system settings, anomaly detection configurations, and data point sizes. In one embodiment, each signal may be assigned a particular amount of memory for storing its sequential set of data points. Although the memory may be operated as any suitable data structure in which the data may be properly ordered (e.g., FIFO, LIFO, push and pop, etc.), in an embodiment the memory may operate as a FIFO (e.g., circular) queue, with newest data points replacing oldest data points within the sequential set of data points, and all of the data points being stored sequentially (e.g., based on a pointer identifying the start (most recent) point in the circular queue).

In an embodiment, the anomaly detection configuration for an anomaly detection definition may also provide information regarding the anomaly detection procedure that will be implemented by each anomaly detection definition. In FIG. 9, a plurality of trending anomaly detection definitions are depicted as $914_1$-$914_X$, and are each associated with a single signal. Although a trending anomaly detection definition $914_1$-$914_X$ is depicted as associated with every signal $912_1$-$912_M$ in FIG. 9, it is not necessary that every signal $912_1$-$912_M$ be associated with an anomaly detection definition. For example, some signals may only be established for purposes of cohesive anomaly detection, e.g., as depicted in FIG. 9 as cohesive anomaly detection definitions $916_1$-$916_Y$. Thus, each signal $912_1$-$912_M$ is associated with at least one anomaly detection definition (e.g., trending, cohesive, or both). Moreover, each signal may be associated with KPIs. In some embodiments an anomaly detection definition may include multiple signals associated with a single KPI. By having multiple signals based off a single KPI, different anomaly detection configurations may be used to determine different types of anomalies for a single KPI.

Anomaly detection may be run for a particular anomaly detection definition in a variety of manners. In an embodiment, the anomaly detector search command 910 may also include search strings that instruct each anomaly detection definition (e.g., trending anomaly detection definitions $914_1$-$914_X$ and cohesive anomaly detection definitions $916_1$-$916_Y$) to run based on its particular definition parameters, providing an anomaly result (based on the required anomaly detection procedure and parameters) for each anomaly detection definition. In some embodiments, the command to perform the anomaly detection analysis may be provided at different times, and for different signals, e.g., periodically based on timing parameters set in the anomaly detection configuration for each anomaly detection definition or in an ad-hoc manner defined by user commands.

Anomaly detection configurations for anomaly detection definitions may also be used to pre-load or backfill data points. In some embodiments, absent an intentional shut down of the anomaly detections definitions or a system error, each of the signals (e.g., signal $912_1$-$912_M$) may continue to persist as long as the signal has a required minimum amount of data (e.g., based on configuration parameters of an anomaly detection configuration). Individual anomaly detection definitions (e.g., one or more of trending anomaly detection definitions $914_1$-$914_X$ and cohesive anomaly detection definitions $916_1$-$916_Y$) may be modified or deleted automatically (e.g., if data from an incoming data stream is no longer available) or manually (e.g., based on a user input at a user interface). In an embodiment, when one of the anomaly detection definitions is modified in a manner that requires the deletion of the signal, or when the entire anomaly detection definition is deleted, the entire signal or signals associated with that anomaly detection definition may be deleted. However, doing so does not impact any other signal of any other anomaly detection definition, unless two anomaly detection definitions share a single signal (e.g., a trending anomaly detection definition and a cohesive anomaly detection definition being based off the same signal). In such a case, the shared signal may be retained for the remaining and unmodified anomaly detection definition.

In an embodiment, when a new anomaly detection definition is created, a new anomaly detection configuration is generated and memory may be identified or allocated for a new signal associated with the new anomaly detection definition. Before performing anomaly detection on the definition, a necessary number of data points must be present within the signal (e.g., a minimum signal length or the entire signal length). In an embodiment, rather than waiting for all the incoming data streams to provide the required number of data points on a going forward basis, data store 906 may be queried in order to acquire historical data 908 for the signal. A query for the data store may reference relevant information such as relevant KPIs, data intervals, and a starting point for the data points. Once the necessary quantity of data points have been accessed from the store and stored at appropriate locations within the signal, new data points may be provided by the incoming data stream. In this manner, a new signal may be initialized quickly based on data in the data store, without impacting the operation of the system or any other signals.

In some embodiments, preliminary anomaly detection results may be provided as data is provided to the signal, until the required number of data points is obtained. It may also be determined in certain instances (e.g., based on a user setting, or analysis of historical data) not to access historical data 908 but instead populate the signal only as new data is received from data streams 904. In such instances, preliminary anomaly detection results may be provided, with an indication that such results are preliminary.

In some embodiments, one or more data points of the signal may be missing, corrupted, or otherwise unavailable. Because data points are sequential, the points in the sequence where data is missing may be identified as target data points and a backfill request may be provided to the data store 906. Historical data 908 corresponding to the target data points may be reinserted at appropriate locations within the sequential set of data points for the signal. In this manner, the signal may be repaired without impacting the system as a whole or any other signals.

3.3. Configuration System for Continuous Anomaly Detection

Figure 10:
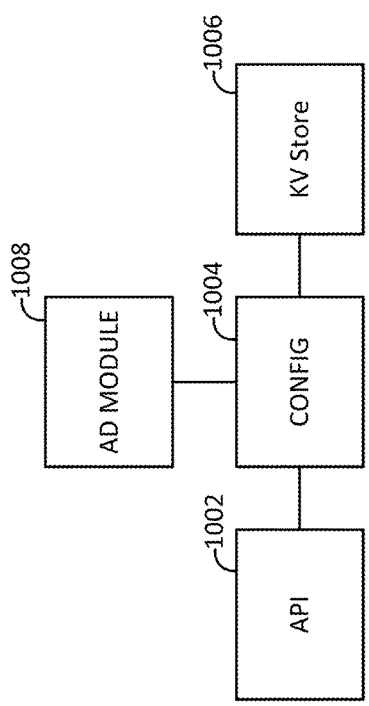
FIG. 10 is a block diagram depicting an exemplary configuration system in accordance with some embodiments of the present disclosure.

FIG. 10 is a block diagram depicting an exemplary configuration system for anomaly detection in accordance with some embodiments of the present disclosure. As described herein, the anomaly detection system may include anomaly detection definitions, each of which has configuration parameters of an anomaly detection configuration. In an embodiment, a configuration system may be provided to allow a user to create, modify, and delete anomaly detection definitions. Although a configuration system may include any suitable components, in an embodiment the configuration system may include an application programming interface (API) 1002 and configuration wrapper 1004. The configuration wrapper 1004 may interface with a key value (KV) store 1006 (which may store the underlying values for the configuration parameters of the anomaly detection configuration), and the anomaly detector module 1008 (which may perform anomaly detection based on those configuration parameters).

In an embodiment, the API 1002 may provide an interface for a user to make requests to the configuration wrapper 1004, which in turn may be a low overhead program operating within the environment of the KV store 1006 in order to quickly and easily identify, access, create, delete and modify information regarding anomaly detection definitions. The API 1002 may be any suitable interface that allows a user to communicate with the configuration wrapper 1004 to access, modify, delete, and change information about anomaly detection definitions. In an embodiment, API 1002 may include a set of commands to allow various standardized operations. In some embodiments, an additional interface such as a graphical user interface (e.g., the GUIs of FIGS. 5-7) may be layered over API 1002 to allow for a user to simply perform the operations enabled by API 1002 and configuration wrapper 1004.

The API 1002 and configuration wrapper 1004 may provide for a variety of communications regarding anomaly detection definitions. In an exemplary embodiment as described herein, the communications may be implemented by a REST API having URL-encoded GET arguments or POST parameters, and may be sent between the API 1002 and configuration wrapper 1004 as JSON messages. However, it will be understood that an API may be implemented in any suitable manner according to any suitable messaging protocol. Moreover, the configuration parameters for the anomaly detection system may be stored and accessed from any suitable data storage location or system, and it will be understood that a KV store 1006 is provided as an exemplary embodiment.

One exemplary communication may request a list of anomaly detection contexts from the KV store 1006. A context may be configuration object that includes one or more anomaly detection definitions and may be associated with a single anomaly detection search (e.g., the signals and anomaly detection definitions serviced by a single anomaly detection search of the context). A system operating the anomaly detection system may include a plurality of contexts, and thus, one request may be a GET "contexts" request that returns the listing of contexts. Another request related to contexts may be a GET "contexts/<context_name>" request that may require a name of a desired context and may return the context name and information about the context if the context exists on the system.

Another exemplary communication related to contexts may be a POST "contexts" request that creates a new context. Exemplary POST parameters for the POST "contexts" request may be a name of the new context, an identification of a search (e.g., a search of a set of incoming data streams, in which the anomaly detection search is implemented) for all of the anomaly detection definitions of the context, a destination for anomaly detection results, whether a saved search is desired, and a location (e.g., a URL) for the POSTing of alert notifications. A result may provide error indications or information about the created context (e.g., name, search, output location of anomaly scores, saved search indication, and whether the context is disabled).

Another exemplary communication related to contexts may be a POST "contexts/<context_name>" request that modifies an existing context. The context name is the name of the context that will be modified, and exemplary POST parameters for the POST "<contexts_name>" request may be an identification of a search (e.g., a search of set of incoming data streams, in which the anomaly detection search is implemented) for all of the anomaly detection definitions of the context, a destination for anomaly detection results, whether the context should be disabled, and a location (e.g., a URL) for the POSTing of alert notifications. A result may provide error indications or information about the modified context (e.g., name, search, output location of anomaly scores, saved search indication, and whether the context is disabled).

Another exemplary communication related to contexts may be a DELETE "contexts/<context_name>" request that deletes the context identified by the context name. A result may provide error indications or information about the deleted context.

Another set of communications may relate to anomaly detection definitions within a particular context. One exemplary communication relating to definitions may be a GET "contexts/<contexts_name>/definitions" request that returns the listing of anomaly detection definitions for the context "context_name."

Another exemplary communication related to definitions may be a GET "contexts/<contexts_name>/definitions/<id>" request that may require a name of a desired anomaly detection definition and may return an error or information about the anomaly detection definition if it can be found within the context "context_name".

Another exemplary communication related to contexts may be a POST "contexts/<contexts_name>/definitions" request that creates a new anomaly detection definition. Exemplary POST parameters for the POST "contexts/<contexts_name>/definitions" request may be a JSON object for a field-value map used to select records from the base search, a name of an anomaly detection procedure to use for the anomaly detection definition, an identification of a JSON object containing configuration parameters for the anomaly detection definition (if not provided, a default configuration may be used), an indicator of whether the anomaly detection definition is disabled, and a resolution (e.g., time interval) for the signal data of the anomaly detection definition. A result may provide error indications or information about the created anomaly detection definition (e.g., id, type of anomaly detection procedure, an identifier for the JSON objects, resolution, and whether the context is disabled).

Another exemplary communication related to contexts may be a POST "contexts/<contexts_name>/definitions/<id>" request that modifies the anomaly detection definition identified by the id. Exemplary POST parameters for the POST "contexts/<contexts_name>/definitions/<id>" request may be a JSON object for a field-value map used to select records from the base search, a name of an anomaly detection procedure to use for the anomaly detection definition, an identification of a JSON object containing configuration parameters for the definition (if not provided, a default configuration may be used), an indicator of whether the anomaly detection definition is disabled, and a resolution (e.g., time interval) for the signal data. A result may provide error indications or information about the modified anomaly detection definition (e.g., id, type of anomaly detection procedure, identifiers JSON objects, resolution, and whether the context is disabled).

Another exemplary communication related to contexts may be a DELETE "contexts/<contexts_name>/definitions/<id>" request that deletes the anomaly detection definition identified by the id. A result may provide error indications or information about the deleted anomaly detection definition.

Another exemplary communication related to contexts may be a POST "contexts/<contexts_name>/definitions/bulk-delete" request that deletes a number of anomaly detection definition at the same time. In an embodiment, a POST parameter may be an array of anomaly detection definition ids, provided, for example, within a JSON object. A response may provide error indications or confirmation of the deleted anomaly detection definitions.

As was discussed above, in some embodiments (e.g., for the creation and modification of definitions), JSON objects may be provided as elements provided in the request. For example, each of the "contexts/<contexts_name>/definitions" and "contexts/<contexts_name>/definitions/<id>" POST requests may include a JSON object that includes field-value map information used to select records from a base search. An exemplary JSON object for providing such a map is provided below:

```
{
    type: "simple_selector", //simple_selector only atm filters: {//implied AND here with filter attributes
        <some key>:<some value>
        . . . .
    },
    value_key: <key of the value field in record>,
        [spl_filter: <predicate to search for this metric>]//OPTIONAL
}
``` e.g.
```
{
    "type": "simple_selector",
    "filters": {
        "itsi_kpi_id": "kpi_1",
        "itsi_service_id": "service_1"
    },
    "spl_filter": "indexed_itsi_kpi_id::kpi_1"
    "value_key": "alert_value"
}
```

As another example, each of the "contexts/<contexts_name>/definitions" and "contexts/<contexts_name>/definitions/<id>" POST requests may include a JSON object that includes configuration parameters for an anomaly detection definition. An exemplary JSON for providing such configuration parameters is provided below:

```
{
    "trainingPeriod": "604800000 ms",
    "maxNAratio": 0.5,
    "currentWindowIx": "current",
    "trendingNtrend": 5,
    "periodsConfig": {
        "1 day": 6,
        "7 days": 2
    },
    "NArm": true,
    "alertConfig": {
        "Naccum": 30
    },
    "selfComparison": false,
    "thresholdConfig": {
        "pctOutlier": 0.2,
        "slopeThreshold": 0.4,
        "diffSigma": 3.0,
        "Nkeep": "180000000 ms"
    },
    "windowConfig": {
        "windowSize": 60,
        "stepSize": 1
    }
}
```

3.4. Anomaly Detection System

Figure 11:
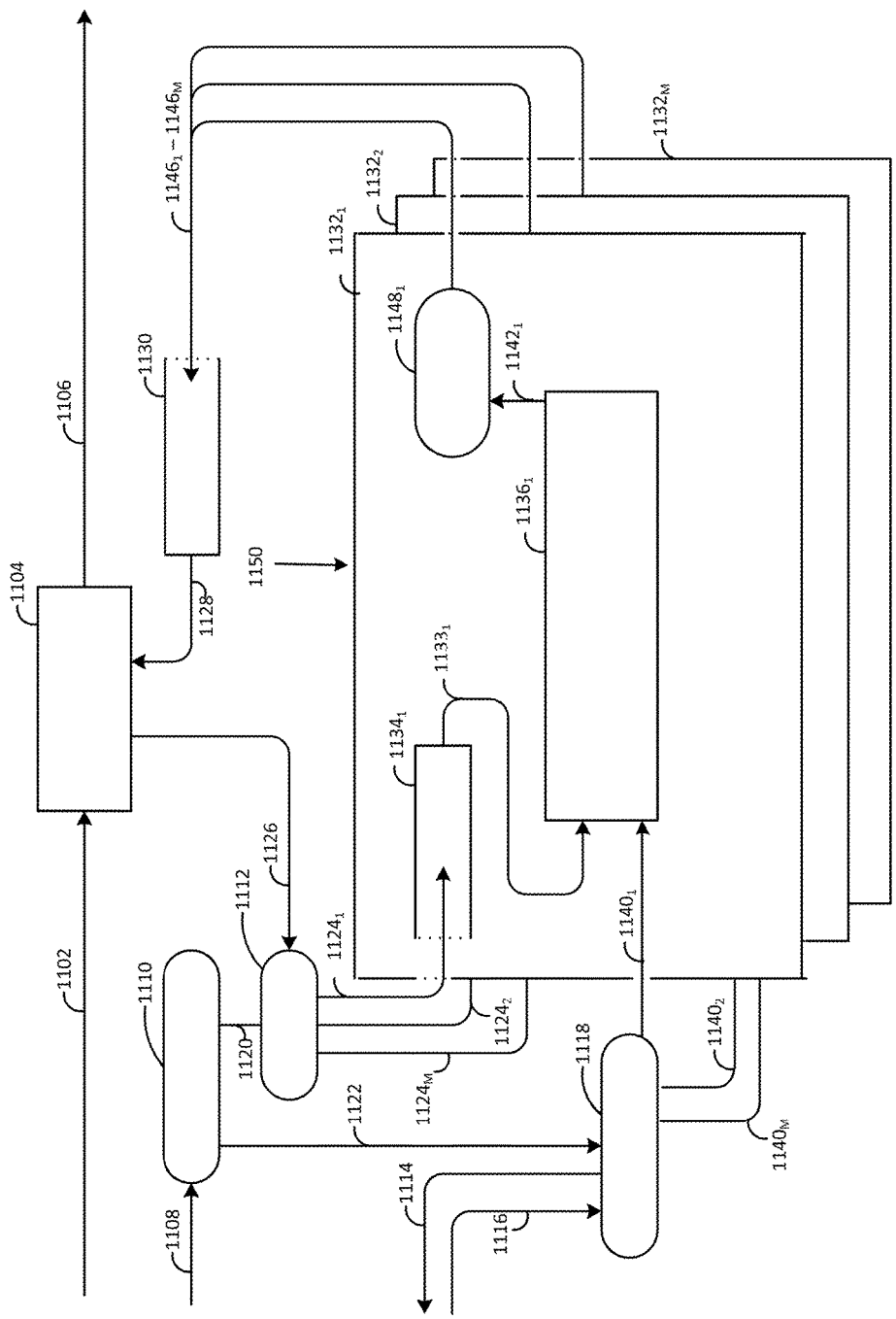
FIG. 11 is a block diagram of an exemplary anomaly detection system in accordance with some embodiments of the present disclosure.

FIG. 11 is a block diagram of an exemplary anomaly detection system in accordance with some embodiments of the present disclosure. The anomaly detection system may operate on one or more computing units such as one or more servers, and may include memory for storing executable code to perform the operations described herein and to store data (e.g., variables, buffers, temporary storage, signals, etc.) as necessary to establish and store signals, and to perform anomaly detection. Some portions of the system may be implemented at separate servers or hardware, as is useful to optimize the operations of the system. Although the operations depicted and described in in FIG. 11 may be performed at any suitable time in response to any suitable stimulus or request, in an embodiment the operations may performed in response to a periodic SPLUNK search. In an embodiment, the anomaly detection system of FIG. 11 may depict a context 1150 having anomaly detection definitions $1132_1$-$1132_M$. The anomaly detection definitions may have a common type of anomaly detection configurations for the context, which may be individually modifiable based on values for individual the anomaly detection configurations.

In an embodiment, an incoming data portion 1102 may be received as a chunk of data from the data source such as a data stream (e.g., the data received from data sources since the previous chunk of data was received) in response to the search, although in some embodiments, other data sources (e.g., a periodic search of data from a data store) may be utilized as the incoming data portion. This data may be accessed by a data management queue such as a chunk turnstile 1104, which may provide some or all of the received incoming data portion 1102 to router 1112. In some embodiments, certain of the data received at chunk turnstile 1104 may not be relevant to anomaly detection (e.g., in an exemplary embodiment, may not be related to a KPI and may not be included in the anomaly detection chunk 1126 that is provided to the router 1112.

The router 1112 may be in communication with definition manager 1110. In an embodiment, definition manager 1110 may control the routing of data to anomaly detection definitions $1132_1$-$1132_M$ based on the configuration parameters of the anomaly detection definitions $1132_1$-$1132_M$ available at definition manager 1110 (e.g., configurations for definitions of context 1150). Definition manager 1110 may receive anomaly detection configurations 1108 (e.g., from a KV store) for context 1150 and based on those anomaly detection configurations 1108 and known information about the anomaly detection definitions $1132_1$-$1132_M$ (e.g. whether a minimum required number of data points is included within the signal), may issue chunk routing requests 1120 to router 1112 and backfill requests 1122 to backfill manager 1118.

In an embodiment, the chunk routing requests 1120 may provide information to identify signals (e.g., a listing of the signals) that are associated with anomaly detection definitions $1132_1$-$1132_M$. (e.g., based on KPIs associated with each of the signals or other data indicators). Based on this information, the router 1112 may identify any matching data from the anomaly detection chunk 1126, extract the matching data, and transmit one or more signal data chunks $1124_1$-$1124_M$ to each of the anomaly detection definitions $1132_1$-$1132_M$ for which data was received in the anomaly detection chunk 1126. In an embodiment, each respective anomaly detection definition $1132_1$-$1132_M$ may include a reorder buffer $1134_1$-$1134_M$ for receiving the signal data chunks. In another exemplary embodiment, the chunk routing request 1120 may analyze the underlying data, e.g., to automatically identify data for definitions based on characteristics of the data.

In an embodiment, the backfill request 1122 may provide information to identify signals (e.g., a listing of signals) for which pre-load or backfill data is required, as well as information necessary to acquire the correct data points and amount of data (e.g., data point intervals for the signal, start and end times for data points, etc.). Based on the backfill requests 1122, the backfill manager 1118 may transmit backfill queries to one or more data stores, and receive backfill responses 1116 including the historical pre-load or backfill data. Backfill manager may then package and route backfill data $1140_1$-$1140_M$ to anomaly detection definitions $1132_1$-$1132_M$ as requested by the backfill request 1122. In another exemplary embodiment, the backfill request 1122 may analyze the underlying data, e.g., to automatically identify data for definitions based on characteristics of the data.

Although incoming data may be stored and processed in a variety of manners, in an embodiment, each of the anomaly detection definitions $1132_1$-$1132_M$ may include memory and processing such as a respective reorder buffer $1134_1$-$1134_M$, received data points $1133_1$-$1133_M$, signal buffer $1136_1$-$1136_M$, signal data points $1142_1$-$1142_M$, and anomaly detection procedure $1148_1$-$1148_M$. Although each anomaly detection definition $1132_1$-$1132_M$ may have different values for configuration parameters (e.g., signal length, data point intervals, anomaly detection procedure, etc.), the types of configuration parameters may be shared for the entire context and the overall operational flow may be similar for each of the anomaly detection definitions. Accordingly, each of the components of the anomaly detection definitions $1132_1$-$1132_M$ will be described generically in the following discussion.

In an embodiment, a reorder buffer 1134 may receive a signal data chunk 1124. In some cases, incoming data portions 1102 for a data stream may not always be provided in chronological order. Incoming data portions 1102 may be received relatively frequently (e.g., every 1-5 seconds), and due to processing latency or other causes may occasionally be received out of chronological order. Accordingly, a reorder buffer 1134 may store the signal data chunks for a longer time than frequency in which incoming data portions are received by the system (e.g., 10-60 seconds). In an embodiment, the reorder buffer 1134 may place the signal data chunks in the correct sequence (e.g., based on timestamps) before providing the received data points 1133 to the signal buffer. In other embodiments (not depicted in FIG. 11), reordering may not be required, and data may be ordered at another time such as at the time that anomaly detection is performed (e.g., based on timestamps of data accessed from a signal).

As described herein, the signal buffer 1136 may also receive backfill data 1140 (e.g., to fulfill a pre-load or backfill request). In some embodiments, the signal buffer 1136 may order the backfill data 1140 and received data points 1133 in sequential order to generate the sequential set of data points of the signal. As described herein, in an embodiment the signal buffer 1136 may be a circular queue that replaces the oldest data points with the most recent data points as incoming received data points 1133 are provided to the signal buffer 1136. Some or all of the sequential set of data points stored in the signal buffer may then be provided as signal data points 1142 to the anomaly detection procedure 1148. In an embodiment, anomaly detection may be performed as described herein, e.g., to determine anomaly detection scores, identify anomalies from those scores, determine information about anomalous data points (e.g., KPI values, etc.), generate alerts, and perform any other suitable anomaly detection processing.

In an embodiment, the resulting anomaly information $1146_1$-$1146_M$ may be provided to an output buffer 1130, which may provide the compiled anomaly data 1128 (e.g., all of the anomaly data generated from one search) to the chunk turnstile 1104, which may provide the compiled anomaly data to other components of the system to generate a user interface and alerts, to store the anomaly data, and to provide other user interface, data analysis, and diagnostic functions.

Figure 12:
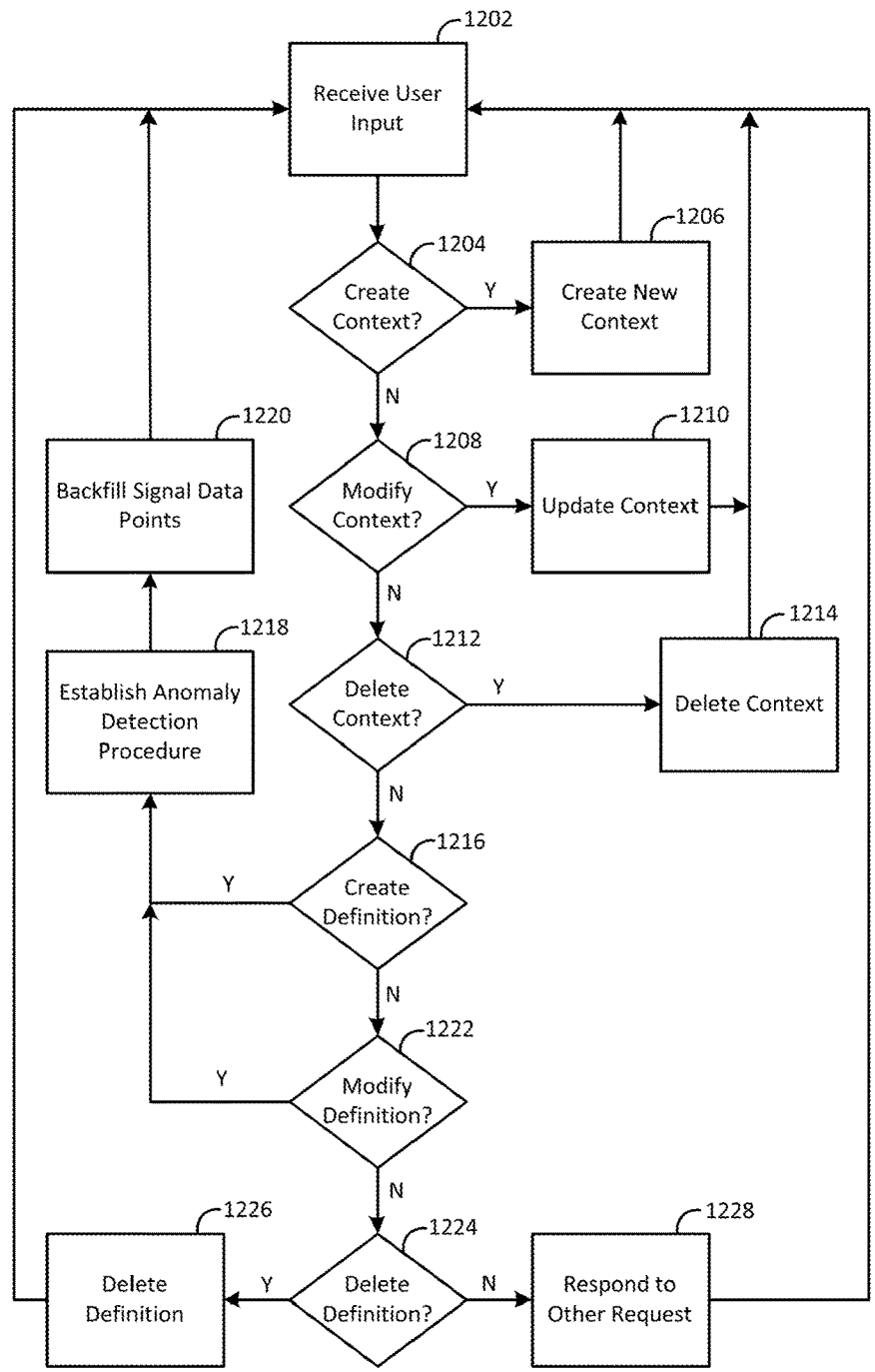
FIG. 12 is a flow diagram depicting exemplary steps for setup and modification of an anomaly detection system in accordance with some embodiments of the present disclosure.
Figure 13:
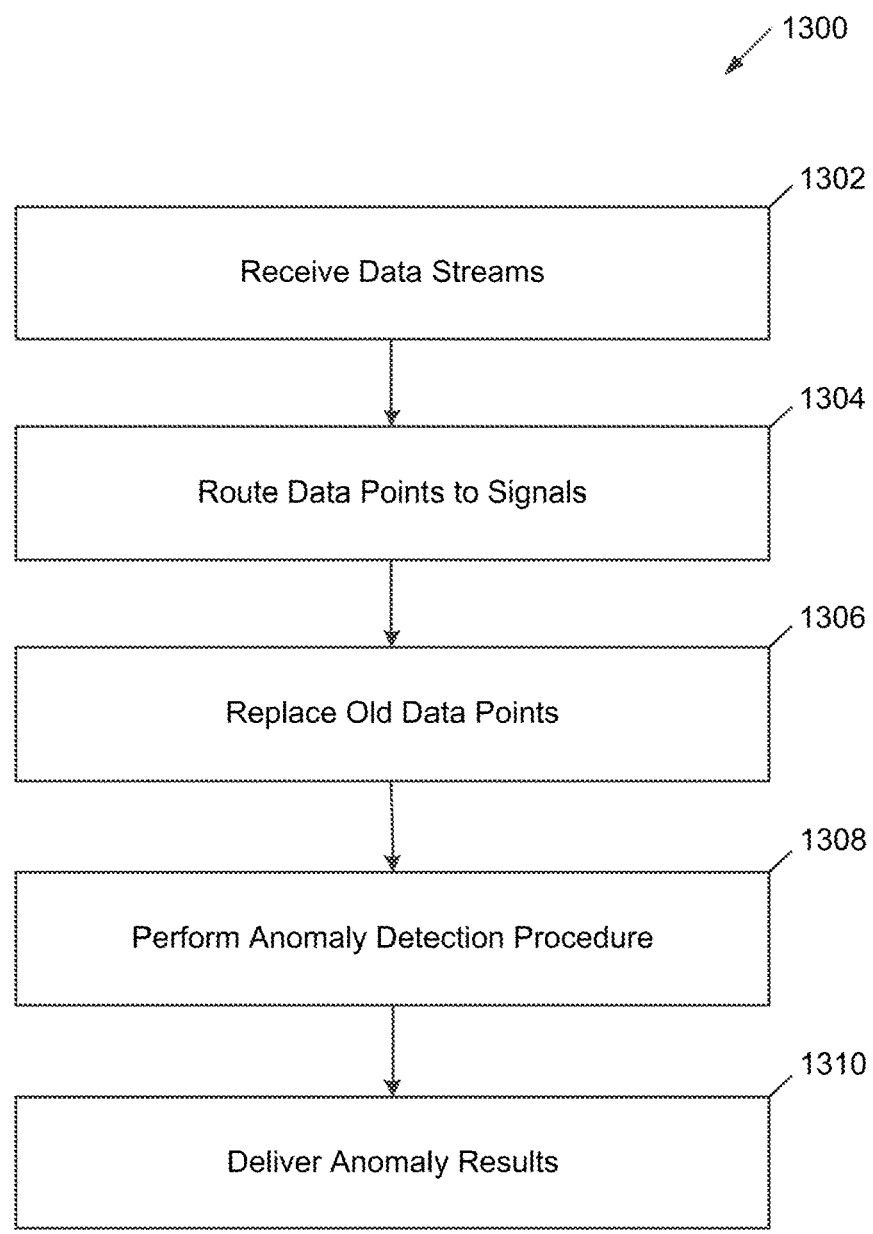
FIG. 13 is a flow diagram depicting exemplary steps for operating an anomaly detection system in accordance with some embodiments of the present disclosure.

The methods of FIGS. 12-13 depict exemplary steps for initializing, modifying, and operating an anomaly detection system in accordance with some embodiments of the present disclosure. Although the steps of FIGS. 12-13 are generally described in the context of applying particular anomaly detection procedures to KPI data, it will be understood that they may apply equally to other anomaly detection procedures and other underlying data sources. Moreover, while the steps described herein may be continuously applied to incoming data streams (e.g., at a regular interval), it will be understood that signals of anomaly detection definitions may be updated in other manners. The steps depicted by FIGS. 12-13 are provided for illustrative purposes only; those skilled in the art will understand that additional steps may be included, that one or more steps may be removed, and that the ordering of the steps of FIGS. 12-13 may be modified in any suitable manner. It will be understood that while particular hardware, software, system components, search techniques, and anomaly detection procedures may be described in the context of FIGS. 12-13, that the steps described herein are not so limited.

FIG. 12 is a flow diagram depicting exemplary steps for setup and modification of a continuous anomaly detection system in accordance with some embodiments of the present disclosure. At step 1202, a user of an anomaly detection system may provide a user input, e.g., to an API 1002. User inputs may include requests relating to contexts, definitions, or other setup and configuration information for the anomaly detection system. In an embodiment, the user input may be provided from the API 1002 to the configuration wrapper 1004, which may interact with the KV store 1006 and anomaly detection module 1008. Processing may then continue to step 1204.

At step 1204, the configuration wrapper 1004 may determine whether the received request is a request to create a new context of anomaly detection definitions. In an embodiment, the configuration wrapper may determine whether the received request relates to a collection of definitions associated with a search (e.g., a context, as indicated by a POST "contexts" request). If a new context is to be created, processing may continue to step 1206. If a new context is not to be created, processing may continue to step 1208.

At step 1206, the configuration wrapper 1004 may interact with a storage system such as the KV store 1006 and an anomaly detection system such as anomaly detection module 1008 to create the new context. In an embodiment, the new context may be created based on information provided in the POST "contexts" request, such as a name of the new context, an identification of a search (e.g., a search of set of incoming data streams, in which the anomaly detection search is implemented), a destination for anomaly detection results, whether a saved search is desired, a location (e.g., a URL) for the POSTing of alert notifications, or any other suitable information relating to a single anomaly detection aspect of a search. After the new context is created at step 1206, a result may be returned to the API 1002 (including information about the created context such as name, search, output location of anomaly scores, saved search indication, and whether the context is disabled) and processing may return to step 1202 to monitor for additional user inputs.

At step 1208, an interface such as the configuration wrapper 1004 may determine whether the received request is a request to modify an existing context. In an embodiment, the configuration wrapper 1004 may determine whether the received request is a POST "contexts/<context_name>" request that identifies an existing context to be modified. If a context is to be modified, processing may continue to step 1210. If a context is not to be modified, processing may continue to step 1212.

At step 1210, an interface such as the configuration wrapper 1004 may interact with a storage system such as the KV store 1006 and an anomaly detection system such as anomaly detection module 1008 to modify the identified context. In an embodiment, the context may be modified based on information provided in the POST "contexts/<context_name>" request, such as an identification of a search (e.g., a search of set of incoming data streams, in which the anomaly detection search is implemented), a destination for anomaly detection results, whether the context should be disabled, a location (e.g., a URL) for the POSTing of alert notifications or any other suitable information relating to a single anomaly detection aspect of a search. After the new context is modified at step 1210, a result may be returned to the API 1002 (including information about the modified context such as name, search, output location of anomaly scores, saved search indication, and whether the context is disabled) and processing may return to step 1202 to monitor for additional user inputs.

At step 1212, an interface such as the configuration wrapper 1004 may determine whether the received request is a request to delete an existing context. In an embodiment, the configuration wrapper may determine whether the received request is a DELETE "contexts/<context_name>" request that identifies an existing context to be deleted. If a context is to be deleted, processing may continue to step 1214. If a context is not to be deleted, processing may continue to step 1216.

At step 1214, in an embodiment, an interface such as the configuration wrapper 1004 may interact with a storage system such as the KV store 1006 and an anomaly detection system such as anomaly detection module 1008 to delete the identified context. After the context is deleted at step 1214, a result may be returned to the API 1002 (including a confirmation and information about the deleted context) and processing may return to step 1202 to monitor for additional user inputs.

At step 1216, an interface such as the configuration wrapper 1004 may determine whether the received request is a request to create a new anomaly detection definition. In an embodiment, the configuration wrapper may determine whether the received request is a POST "contexts/<contexts_name>/definitions" request. If a new anomaly detection definition is to be created, processing may continue to step 1218. If a new anomaly detection definition is not to be created, processing may continue to step 1222.

At step 1218, an interface such as the configuration wrapper 1004 may interact with a storage system such as the KV store 1006 and an anomaly detection system such as anomaly detection module 1008 to establish the anomaly detection procedure. In an embodiment, the anomaly detection procedure may be established based on information provided in the POST "contexts/<contexts_name>/definitions" request or a POST "contexts/<contexts_name>/definitions/<id>" request, such as a name of an anomaly detection procedure to use for the anomaly detection definition, an identification of a JSON object containing configuration parameters for the definition (if not provided, a default configuration may be used), and an indicator of whether the anomaly detection definition is disabled. Processing may then continue to step 1220.

At step 1220, an interface such as the configuration wrapper 1004 may interact with a storage system such as the KV store 1006 and an anomaly detection system such as anomaly detection module 1008 to establish the signal and backfill the signal with data from a data store. In an embodiment, the information to establish the signal may be based on information provided in the POST "contexts/<contexts_name>/definitions" request or a POST "contexts/<contexts_name>/definitions/<id>" request, such as a JSON object for field-value map used to select records from the base search and a resolution (e.g., time interval) for the signal data. Based on this information, the memory (e.g., circular queue for the signal) for the signal may be established and a pre-load or backfill request may be provided to the data store to populate the signal with data points. Processing may then return to step 1202 to monitor for additional user inputs.

At step 1222, an interface such as the configuration wrapper 1004 may determine whether the received request is a request to modify an existing anomaly detection definition. In an embodiment, the configuration wrapper may determine whether the received request is a POST "contexts/<contexts_name>/definitions/<id>" request. If an anomaly detection definition is to be modified, processing may continue to step 1218. In some embodiments, the existing signal may be deleted and a new signal and anomaly detection definition may be established in the same manner as for a newly created anomaly detection definition in steps 1218 and 1220. In other embodiments, one or both of steps 1218 and 1220 may be modified such that existing data points of a signal are reordered and adjusted based on a backfill request, and the anomaly detection definition is retained but modified based on the changed configuration parameters. If the anomaly detection definition is not modified, processing may continue to step 1224.

At step 1224, an interface such as the configuration wrapper 1004 may determine whether the received request is a request to delete an existing anomaly detection definition. In an embodiment, the configuration wrapper 1004 may determine whether the received request is a DELETE "contexts/<context_name>/definitions/<id>" request that identifies an existing anomaly detection definition to be deleted. If an anomaly detection definition is to be deleted, processing may continue to step 1226. If an anomaly detection definition is not to be deleted, processing may continue to step 1228.

At step 1226, in an embodiment, an interface such as the configuration wrapper 1004 may interact with the a storage system such as the KV store 1006 and an anomaly detection system such as anomaly detection module 1008 to delete the identified anomaly detection definition. After the anomaly detection definition is deleted at step 1226, a result may be returned to the API 1002 (including a confirmation and information about the deleted anomaly detection definition) and processing may return to step 1202 to monitor for additional user inputs.

At step 1228, in an embodiment, an interface such as the configuration wrapper 1004 may interact with a storage system such as the KV store 1006 and an anomaly detection system such as anomaly detection module 1008 to respond to any other requests. Examples of such requests include GET "contexts" request (e.g., for querying the configuration wrapper 1004 and KV store 1006 for a listing of contexts), a GET "contexts/<context_name>" request (e.g., for querying the configuration wrapper 1004 and KV store 1006 for information about a specific context), a GET "contexts/<contexts_name>/definitions" request (e.g., for querying the configuration wrapper 1004 and KV store 1006 for a listing of anomaly detection definitions), and a GET "contexts/<contexts_name>/definitions/<id>" (e.g., for querying the configuration wrapper 1004 and KV store 1006 for information about a specific anomaly detection definition). Processing may then return to step 1202 to monitor for additional user inputs.

FIG. 13 is a flow diagram depicting exemplary steps for operating a continuous anomaly detection system in accordance with some embodiments of the present disclosure. At step 1302, an incoming data source (e.g., data streams 904, or data accessed by searching a data store) may be received from one or more data sources (e.g., data sources $902_1$-$902_N$) by the anomaly detection system (e.g., at a chunk turnstile 1104). In an embodiment, data points from the data streams (e.g., anomaly detection chunks) may be provided to a router (e.g., router 1112) as a result of continuous periodic search. Processing may then continue to step 1304.

At step 1304, relevant data points may be routed to signals. In an embodiment, a definition manager (e.g., definition manager 1110) may access anomaly detection configurations (e.g., anomaly detection configurations 1108 for anomaly detection definitions $1132_1$-$1132_M$) for a context in order to provide directions (e.g., chunk routing requests) for routing the newly received data points to signals (e.g. signals $1136_1$-$1136_M$ of the anomaly detection definitions $1132_1$-$1132_M$). Each set of data points that is associated with a signal may be provided to its associated signal (e.g., as signal data chunks $1124_1$-$1124_M$). Once the data points have been provided to the signals, processing may continue to step 1306.

At step 1306, the sequential set of data points of each signal that receives new data points may be modified based on the newly received data points. In an embodiment of a circular queue, the oldest sequential data points may be replaced by the newest sequential data points. In other queueing systems, the data points may be stored in a different manner (e.g., by changing pointers associated with the start and end of the memory for this signal). In some embodiments, processing of the new data points may include reordering the data points (e.g., signal data chunks $1124_1$-$1124_M$) in a buffer (e.g., a reorder buffer $1134_1$-$1134_M$), although, in some embodiments, ordering may be performed at other times such as at the time of anomaly detection. In some embodiments, one or more of the data points within a signal may be also be updated based on backfill data (e.g., backfill data $1140_1$-$1140_M$), which may be accessed from a data store (e.g., data store 908) based on a backfill procedure (e.g., as performed by backfill manager 1118 and definition manager 1110). Once the signal data points have been replaced, processing may continue to step 1308.

At step 1308 an anomaly detection procedure may be performed on the signal data (e.g., by anomaly detection procedures $1148_1$-$1148_M$ analyzing signal data points $1142_1$-$1142_M$). As described herein, a variety of anomaly detection procedures may be applied (e.g., trending, cohesive, or sparse) based on a variety of parameters (e.g., thresholds, sensitivity settings, signal length, alert settings, etc.). In an embodiment, the anomaly detection procedures may determine anomaly detection scores, identify anomalies from those scores, determine information about anomalous data points (e.g., KPI values, etc.), and generate alerts. Processing may then continue to step 1310. In some embodiments, related data may also be analyzed with the anomaly detection procedure, e.g., based on related data input 612. It may be determined whether errors or other changes to the related data are related (e.g., correlated) to the determined anomaly.

At step 1310, the anomaly detection results may be delivered to one or more systems (e.g., via output buffer 1130 and chunk turnstile 1104, as anomaly detection results 1106). In some embodiments, anomaly detection results may be provided for storage, for display at a user interface, for further analysis by other computational systems, to alerting systems, and to various other interfaces that may utilize the anomaly detection results. Processing of steps 1300 may then end.

The foregoing provides illustrative examples of the present disclosure, which are not presented for purposes of limitation. It will be understood by a person having ordinary skill in the art that various modifications may be made within the scope of the present disclosure. It will also be understood that the present disclosure need not take the specific form explicitly described herein, and the present disclosure is intended to include variations to and modifications thereof, consistent with the appended claims. It will also be understood that variations of the systems, apparatuses, and processes may be made to further optimize those systems, apparatuses, and processes. The disclosed subject matter is not limited to any single embodiment described herein, but rather should be construed in breadth and scope in accordance with the appended claims.

What is claimed is:

1. A computer-implemented method for configuring a continuous anomaly detection service, comprising:
    accessing a plurality of anomaly detection definitions, wherein each of the plurality of anomaly detection definitions comprises an anomaly detection configuration that defines how to generate and store, for a corresponding signal, a sequential set of data points from a plurality of historical data points not stored in the sequential set of data points;
    receiving a request to modify a first anomaly detection definition of the plurality of anomaly detection definitions, wherein the first anomaly detection definition comprises a first anomaly detection configuration for a corresponding first signal;
    updating the first anomaly detection configuration based on the request to modify;
    updating the first signal, based on the updated first anomaly detection configuration, by replacing data points of the sequential set of data points of the first signal with a subset of the plurality of historical data points; and
    continuously analyzing memory storing the signals to determine a corresponding anomaly result for each of the plurality of anomaly detection definitions, wherein the anomaly result for the first anomaly detection definition is based on the updated first anomaly detection configuration.

2. The computer-implemented method of claim 1, wherein receiving a request to modify a first anomaly detection definition of the plurality of anomaly detection definitions comprises:
    receiving the request to modify the first anomaly detection definition; and
    determining, from the request to modify, which of the plurality of anomaly detection definitions comprises the first anomaly detection definition.

3. The computer-implemented method of claim 2, wherein the first anomaly detection configuration comprises a plurality of first configuration parameters, wherein the request to modify includes revised values for one or more of the first configuration parameters, and wherein updating the first anomaly detection configuration based on the request to modify comprises updating the one or more of the first configuration parameters with the revised values.

4. The computer-implemented method of claim 1, wherein a first configuration object of a plurality of configuration objects includes all of the plurality of anomaly detection definitions.

5. The computer-implemented method of claim 4, further comprising a second configuration object and second plurality of anomaly detection definitions, wherein the second configuration object includes all of the second plurality of anomaly detection definitions.

6. The computer-implemented method of claim 4, wherein the first configuration object defines a shared search for the plurality of anomaly detection definitions.

7. The computer-implemented method of claim 1, further comprising:
    determining, based on the updated first anomaly detection configuration, that the first signal requires modification; and
    modifying the first signal based on the updated anomaly detection configuration.

8. The computer-implemented method of claim 7, wherein modifying the first signal comprises:
    deleting all existing data points of the sequential set of data points of the first signal;
    accessing the subset of the plurality of historical data points; and
    replacing the deleted data points of the sequential set of data points with the subset of the plurality of historical data points.

9. The computer-implemented method of claim 7, wherein modifying the first signal comprises:
    identifying target data points of the sequential set of data points of the first signal, wherein the target data points do not conform to the requirements of the updated first anomaly detection configuration;
    identifying the subset of the plurality of historical data points to replace the target data points in the sequential set of data points; and
    replacing the target data points with the subset of the plurality of historical data points.

10. The computer-implemented method of claim 9, wherein the replacement of the target data points with the subset of the historical data points results in a change in the sequence of the sequential set of data points.

11. The computer-implemented method of claim 1, wherein the anomaly detection configuration defines how to update the sequential set of data points with substantially real-time data.

12. The computer-implemented method of claim 11, wherein deleting the requested anomaly detection definition comprises deleting the sequential set of data points of the signal of the deleted anomaly detection definition.

13. The computer-implemented method of claim 1, further comprising:
    receiving a request to create a new anomaly detection definition, wherein the request includes a new anomaly detection configuration for a new signal of the new anomaly detection definition;
    determining a corresponding subset of the plurality of historical data points that are required for a new sequential set of data points of the new signal based on the new anomaly detection configuration;
    accessing the corresponding subset of the historical data points; and generating the new signal based on the corresponding subset of the historical data points and the new anomaly detection configuration.

14. The computer-implemented method of claim 13, further comprising determining an anomaly result for the new anomaly detection definition based on the new signal and the new anomaly detection configuration.

15. The computer-implemented method of claim 1, further comprising:
receiving a plurality of data streams;
determining, for each of the anomaly detection definitions, that one of the plurality of data streams is associated with the corresponding signal for the anomaly detection definition;
identifying, for each of the anomaly detection definitions, one or more data points of the associated data stream; and
updating, for each of the anomaly detection definitions, the sequential set of data points of the corresponding signal with the one or more data points.

16. The computer-implemented method of claim 15, wherein determining, for each of the anomaly detection definitions, that one of the plurality of data streams that is associated with the corresponding signal for the anomaly detection definition comprises performing a search of the plurality of data streams based on a plurality of key performance indicators, wherein each signal is associated with one or more of the key performance indicators.

17. The computer-implemented method of claim 1, wherein each anomaly detection configuration comprises a plurality of configuration parameters, and wherein the configuration parameters comprise an anomaly detection threshold, a signal length, a signal resolution, an associated key performance indicator, an alert setting, or an anomaly detection procedure.

18. The computer-implemented method of claim 1, wherein each anomaly detection configuration comprises an anomaly detection procedure, and wherein the anomaly detection procedure comprises a trending anomaly detection procedure or a cohesive anomaly detection procedure.

19. A non-transitory computer-readable storage medium comprising instructions stored thereon, which when executed by one or more processors, cause the one or more processors to perform operations comprising:
accessing a plurality of anomaly detection definitions, wherein each of the plurality of anomaly detection definitions comprises an anomaly detection configuration that defines how to generate and store, for a corresponding signal, a sequential set of data points from a plurality of historical data points not stored in the sequential set of data points;
receiving a request to modify a first anomaly detection definition of the plurality of anomaly detection definitions, wherein the first anomaly detection definition comprises a first anomaly detection configuration for a corresponding first signal;
updating the first anomaly detection configuration based on the request to modify;
updating the first signal, based on the updated first anomaly detection configuration, by replacing data points of the sequential set of data points of the first signal with a subset of the plurality of historical data points; and
continuously analyzing memory storing the signals to determine corresponding anomaly result for each of the plurality of anomaly detection definitions, wherein the anomaly result for the first anomaly detection definition is based on the updated first anomaly detection configuration.

20. A system for performing continuous anomaly detection, comprising:
at least one memory having instructions stored thereon; and
at least one processor configured to execute the instructions to:
access a plurality of anomaly detection definitions, wherein each of the plurality of anomaly detection definitions comprises an anomaly detection configuration that defines how to generate and store, for a corresponding signal, a sequential set of data points from a plurality of historical data points not stored in the sequential set of data points;
receive a request to modify a first anomaly detection definition of the plurality of anomaly detection definitions, wherein the first anomaly detection definition comprises a first anomaly detection configuration for a corresponding first signal;
update the first anomaly detection configuration based on the request to modify;
update the first signal, based on the updated first anomaly detection configuration, by replacing data points of the sequential set of data points of the first signal with a subset of the plurality of historical data points; and
continuously analyze a portion of the at least one memory storing the signals to determine a corresponding anomaly result for each of the plurality of anomaly detection definitions, wherein the anomaly result for the first anomaly detection definition is based on the updated first anomaly detection configuration.

* * * * *